United States Patent
Wu

(10) Patent No.: US 12,477,504 B2
(45) Date of Patent: Nov. 18, 2025

(54) SUPPORTING LOCATION SERVICES AT A BASE STATION

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 394 days.

(21) Appl. No.: 17/601,630

(22) PCT Filed: Apr. 5, 2019

(86) PCT No.: PCT/US2019/026187
§ 371 (c)(1),
(2) Date: Oct. 5, 2021

(87) PCT Pub. No.: WO2020/204961
PCT Pub. Date: Oct. 8, 2020

(65) Prior Publication Data
US 2022/0201645 A1 Jun. 23, 2022

(51) Int. Cl.
*H04W 64/00* (2009.01)
*H04W 80/02* (2009.01)

(52) U.S. Cl.
CPC .......... *H04W 64/003* (2013.01); *H04W 80/02* (2013.01)

(58) Field of Classification Search
CPC ... H04W 64/003; H04W 80/02; H04W 64/00; H04W 4/70; H04W 4/90; H04W 4/02; H04W 4/029
See application file for complete search history.

(56) References Cited

U.S. PATENT DOCUMENTS

| | | | |
|---|---|---|---|
| 10,080,098 B1 * | 9/2018 | Edge | H04L 63/08 |
| 11,792,766 B2 * | 10/2023 | Ren | H04L 5/0048 |
| | | | 455/456.1 |

(Continued)

FOREIGN PATENT DOCUMENTS

| | | | | |
|---|---|---|---|---|
| CN | 101998561 A | * | 3/2011 | H04W 36/00 |
| CN | 110881216 A | * | 3/2020 | G01S 5/0018 |

(Continued)

OTHER PUBLICATIONS

CATT. Consideration on Supporting Local LMF in NR Positioning R16. R2-1816955, 3GPP TSG RAN WG2 Meeting #104. Spokane, USA. Nov. 2, 2018 (Year: 2018) (Year: 2018).*

(Continued)

*Primary Examiner* — Yuwen Pan
*Assistant Examiner* — Swati Jain
(74) *Attorney, Agent, or Firm* — MARSHALL, GERSTEIN & BORUN LLP

(57) ABSTRACT

To efficiently support location services, a base station receives an uplink (UL) message from a user equipment (UE) (2002). The base station determines whether the UL message includes a positioning protocol message associated with a positioning protocol for exchanging information related to a location service (2004). In a first instance, in response to determining that the UL message includes the positioning protocol message, the base station sends the positioning protocol message to a local entity that implements a location service (2010). In a second instance, in response to determining that the message does not include any positioning protocol messages, the base station sends at least some of the data included in the UL message to a remote node (2012).

20 Claims, 21 Drawing Sheets

(56) References Cited

U.S. PATENT DOCUMENTS

| | | | |
|---|---|---|---|
| 2008/0162637 A1 | 7/2008 | Adamczyk et al. | |
| 2011/0143771 A1* | 6/2011 | Edge | H04L 67/52 455/456.1 |
| 2012/0225675 A1* | 9/2012 | Nishida | H04W 4/029 455/456.5 |
| 2015/0156708 A1* | 6/2015 | Tietz | H04W 64/00 455/434 |
| 2016/0227365 A1* | 8/2016 | Siomina | H04W 64/00 |
| 2018/0199306 A1 | 7/2018 | Edge et al. | |
| 2018/0324740 A1 | 11/2018 | Edge et al. | |
| 2018/0343635 A1* | 11/2018 | Edge | G01S 5/0036 |
| 2019/0141482 A1* | 5/2019 | Edge | H04W 36/14 |
| 2019/0268725 A1* | 8/2019 | Edge | H04W 4/029 |
| 2020/0037283 A1* | 1/2020 | Edge | H04W 64/00 |
| 2020/0092776 A1* | 3/2020 | Edge | H04W 8/12 |
| 2020/0267508 A1* | 8/2020 | Fischer | H04W 4/029 |
| 2020/0383083 A1* | 12/2020 | Edge | G01S 5/0045 |
| 2021/0274459 A1* | 9/2021 | Wang | G01S 5/0054 |
| 2021/0297982 A1* | 9/2021 | Zhang | G01S 5/0036 |
| 2021/0345147 A1* | 11/2021 | Zhang | H04W 64/00 |
| 2021/0392612 A1* | 12/2021 | Zhang | H04W 64/006 |
| 2022/0007326 A1* | 1/2022 | Zhang | G01S 5/0036 |
| 2022/0050165 A1* | 2/2022 | Akkarakaran | H04W 64/003 |
| 2022/0053293 A1* | 2/2022 | Hwang | H04W 4/029 |
| 2022/0095075 A1* | 3/2022 | Tenny | H04L 69/08 |
| 2022/0103973 A1* | 3/2022 | Sirotkin | H04W 4/02 |
| 2022/0150809 A1* | 5/2022 | Guo | H04W 48/18 |
| 2022/0167302 A1* | 5/2022 | Ni | H04W 4/029 |
| 2022/0174574 A1* | 6/2022 | Ni | H04W 64/00 |
| 2022/0191764 A1* | 6/2022 | Ni | H04W 36/32 |
| 2023/0362591 A1* | 11/2023 | Edge | H04W 4/029 |

FOREIGN PATENT DOCUMENTS

| | | | |
|---|---|---|---|
| EP | 1 440 599 A1 | 7/2004 | |
| WO | WO-03/034770 A1 | 4/2003 | |
| WO | WO-2011020375 A1 * | 2/2011 | H04W 36/00 |
| WO | WO-2018217323 A1 * | 11/2018 | G01S 19/06 |
| WO | WO-2021047454 A1 * | 3/2021 | |

OTHER PUBLICATIONS

Huawei, "PositioningoperationsconsideringdifferentLMFdeploymentscenarios"SAWG2 Meeting#127bis(2018). (Year: 2018).*
Catt, "ConsiderationonSupportingLocalLMFinNRPositioningR16,"3GPPTSGRANWG2 Meeting#104(2018). (Year: 2018).*
"3rd Generation Partnership Project; Technical Specification Group Services and System Aspects; Study on Enhancement to the 5GC LoCation Services (Release 16)," 3GPP TR 23.731 V16.0.0 (Dec. 2018).
First Examination Report for India Application No. 202147049280, dated Apr. 1, 2022.
Huawei, "Discussion on NR Positioning Architecture," 3GPP TSG-RAN3 Meeting #103 (2019).
Intel Corporation, "Email Discussion Report on [104#35][NR] Positioning SI," 3GPP TSG RAN WG2 Meeting #105 (2019).
Intel Corporation, "RAN3 Scope of the Positioning SI," 3GPP TSG-RAN WG #103 (2018).
Office Action for Chinese Application No. 201980096839.0, dated Dec. 21, 2023.
Qualcomm Incorporated, NG-RAN Positioning Architecture and Procedures, 3GPP TSG-RAN WG3 Meeting #103 (2019).
International Search Report and Written Opinion for Application No. PCT/US2019/026187, dated Dec. 12, 2019.
"3rd Generation Partnership Project; Technical Specification Group Radio Access Network; NG Radio Access Network (NG-RAN); Stage 2 functional specification of User Equipment (UE) positioning in NG-RAN (Release 15)," 3GPP TS 38.305 V15.1.0 (2018-09).
CATT, "Consideration on Supporting Local LMF in NR Positioning R16," 3GPP TSG RAN WG2 Meeting #104 (2018).
China Mobile, "Local network exposure with LLMF," SA WG2 Meeting #129bis (2018).
Huawei, "Positioning operations considering different LMF deployment scenarios" SA WG2 Meeting #127bis (2018).

* cited by examiner

SUPPORTING LOCATION SERVICES AT A BASE STATION

FIELD OF THE DISCLOSURE

This disclosure relates generally to wireless communications and, more particularly, to location-based services that operate in wireless communication systems.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Location Services (LCS) allow a user equipment unit (UE) and/or a base station to determine the geographic location of the UE when, for example, the UE is not capable of determining its location due to limited hardware capability, when the UE receives insufficient satellite or other beacon signals, or when the base station is attempting to locate the UE in an emergency situation.

Entities that support LCS in a core network (CN) include a Location Management Function (LMF) and an Evolved Serving Mobile Location Center (E-SMLC), for example. A UE can exchange messages with an LMF using a positioning protocol such as the LTE positioning protocol (LPP) described in the 3GPP TS 36.355 v15.2.0 standard. According to another standard, 3GPP TS 24.501, a UE sends LPP messages to an access management function (AMF) operating in a CN, in an uplink (UL) non-access stratum (NAS) Transport message. The AMF in turn sends the LPP messages to the LMF or E-SMLC. In the downlink direction, the AMF sends LPP messages from the LMF or E-SMLC to the UE using DL NAS Transport messages.

A recent 3GPP technical document, R2-1816955, proposed to implement "local LCS," particularly a local LMF operating in the radio access network (RAN). However, implementing this architecture using the available messaging schemes can result in increased message latency, excessive transmission overhead, and inefficient use of the network links.

SUMMARY

A base station of this disclosure efficiently transports messages related to a location service (e.g., LTE positioning protocol (LPP) messages, NR positioning protocol (NRPP) messages, or other suitable positioning protocol messages) received from a UE or addressed to the UE. As one example, the base station of this disclosure sends certain positioning protocol messages directly to an LCS entity operating in the RAN, without routing these messages via the CN, thereby reducing the latency of these positioning protocol messages. Further, the base station and the UE of this disclosure reduce the overhead of sending positioning protocol messages by layering at least some of these messages directly over the protocol for controlling radio resources, without relying on an intermediate layer. Some positioning protocol messages with reduced overhead travel between the UE and a node in the RAN, and some travel between the UE and the CN.

As used herein, "sending a message" can refer to transmitting the message over a wireless or wired interface (e.g., a certain radio access technology (RAT) such as 5G NR for example, Xn interface for interconnecting base stations, NG interface for interconnecting base stations and the 5GC) to another node, as well as sending the message to another entity co-located in the same node. Further, as used herein, "transporting a message" can refer to layering the message over one or more underlying protocols (i.e., encapsulating the message) and sending the message to the appropriate addressee, in the same node or a different node.

Moreover, these techniques allow the UE to selectively access RAN-based LCS, CN-based LCS, or both. In particular, a wireless communication network can include an LMF or an E-SMLC implemented in a node of the CN to provide CN-based LCS, and/or an LMF implemented in a RAN node (e.g., a base station or another device operating in the RAN) to provide RAN-based LCS. The UE can choose between RAN-based LCS and CN-based LCS based on the capability of the UE, for all LCS services and/or messages of the positioning protocol or only some of the services and/or messages. The base station in some implementations determines whether the RAN supports local LCS and provides to the UE an appropriate indication of this determination prior to receiving uplink positioning protocol messages. The base station also can provide to the UE an indication of whether the CN supports LCS, or the UE can expect the CN to support LCS by default.

The base station in one implementation supports at least partial processing of NAS messages to determine whether an UL NAS message includes a positioning protocol message. When the UL NAS message includes a positioning protocol message, the base station sends the positioning protocol message to the local LMF (or, more generally, a local LCS entity); otherwise, the base station sends the UL NAS message to a remote node at the CN.

In another example implementation, when the RAN supports local LCS, the UE and the base station layer positioning protocol messages directly over the radio resource control (RRC) layer. In yet another implementation, the UE layers some positioning protocol messages over NAS/RRC, and other positioning protocol messages directly over RRC. The base station accordingly determines whether a positioning protocol message should be routed to the local LCS or a remote LCS entity based on whether the positioning protocol message is layered over NAS or directly over RRC.

One example embodiment of these techniques is a method for supporting location services. The method can be implemented by processing hardware at a base station and comprise receiving an UL message from a user equipment UE, determining whether the UL message includes a positioning protocol message associated with a positioning protocol for exchanging information related to a location service. In a first instance, in response to determining that the UL message includes the positioning protocol message, the method includes sending the positioning protocol message to a local entity that implements a location service. In a second instance, in response to determining that the message does not include any positioning protocol messages, the method includes sending at least some of the data included in the UL message to a remote node.

Another example embodiment of these techniques is a base station comprising processing hardware and configured to implement the method above.

Another example embodiment of these techniques is a method for communicating information related to location services. The method can be implemented by processing hardware at a UE and comprises generating a positioning protocol message associated with a positioning protocol for exchanging information related to a location service, generating an UL RRC message, including layering the positioning protocol message directly over an RRC layer of the UL RRC message, and sending the UL RRC message to the base station via a radio interface.

Another example embodiment of these techniques also is a method for communicating information related to location services. The method can be implemented by processing hardware at a UE and comprises generating a positioning protocol message associated with a positioning protocol for exchanging information related to a location service and determining whether the positioning protocol message is addressed to a RAN node or a CN node. In a first instance, the method includes including the positioning protocol message in a first lower-layer message in response to determining that the positioning protocol message is addressed to the RAN node, and sending the first lower-layer message to a base station via a radio interface. In a second instance, the method includes including the positioning protocol message in a second lower-layer message in response to determining that the positioning protocol message is addressed to the CN node, and sending the second lower-layer message to the base station via the radio interface.

Still another example embodiment of these techniques is a UE comprising processing hardware and configured to implement one of the methods above.

Another example embodiment of these techniques is a computer program product comprising instructions which, when the program is executed by a computing device, cause the computing device to carry out one of the methods above.

DETAILED DESCRIPTION OF THE DRAWINGS

Figure 1:
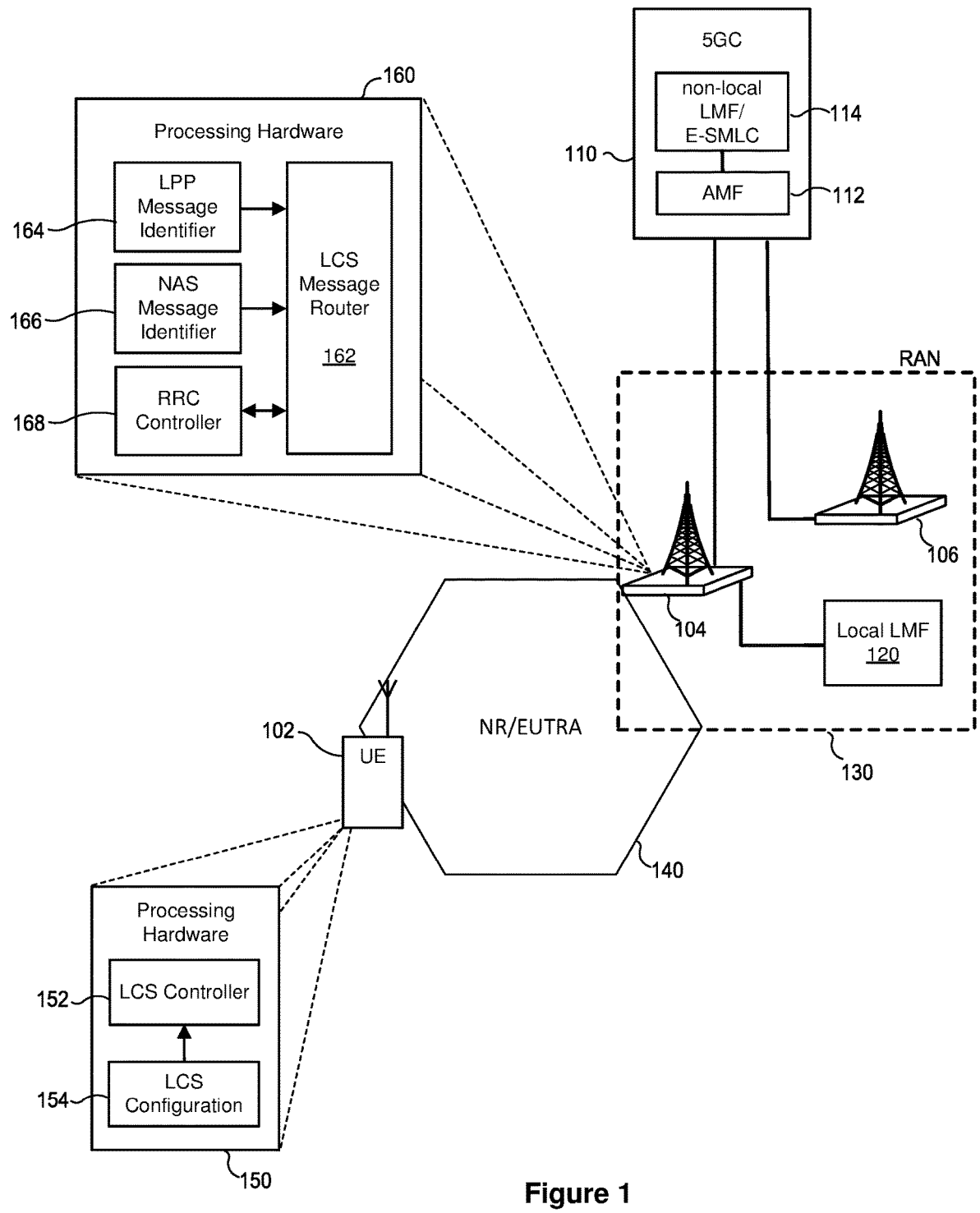
FIG. 1 is a block diagram of an example wireless communication network in which a base station and a UE can communicate with an LCS entity implemented in a RAN, in accordance with the techniques of this disclosure.

FIG. 1 depicts an example wireless communication network 100 in which a UE 102 generates and receives messages related to positioning services, and a base station 104 transports messages related to positioning services, using the messaging techniques of this disclosure. The UE 102 can generate and receive these messages according to a positioning protocol such as LPP. As discussed below, the UE 102 and the base station 104 can layer these positioning protocol messages over lower-level protocols so as to reduce the transmission overhead as well as efficiently address and/or transport these messages to nodes of the RAN and/or the CN.

The base station 104 can operate as a 5G Node B (gNB) that supports an NR cell 108. In another implementation, the base station 104 operates as a next-generation evolved Node B eNB (ng-eNB), and the cell 108 supports an Evolved Universal Terrestrial Radio Access (EUTRA) radio interface. In either case, the base station 104 connects (directly or indirectly) to a 5G core network (5GC) 110 to access various core network functions, services, components, etc. including an AMF 112 and an LMF/E-SMLC 114. Depending on the implementation, the component 114 includes an LMF (to which this document can refer to as "non-local LMF" for clarity), an E-SMLC, or both. In some implementations, the base station 104 can be a disaggregated base station consisting of a centralized unit (CU) and a distributed unit (DU).

The base station 104 can connect to a separate device or node that implements a local LMF 120. In another implementation, the local LMF is co-located with the base station 104, and operates as a software and/or a hardware component of the base station 104. Another base station 106, which also can operate a gNB or an ng-eNB, connects to the 5GC 110 and supports the same cell 108 or another cell. In some implementations, the base station 106 also can access the local LMF 120.

In operation, the local LMF 120 can generate (i.e. derive or compute) the location information using a positioning result from a UE 102 and map information. Alternatively, the local LMF 120 may generate (i.e. derive or compute) the location information using the positioning result and other location information, which can indicate a reference location (e.g., location of the local LMF 120). As a further example, the local LMF 120 may receive an LPP Provide Location Information message (which can be referred to as a first LPP Provide Location Information message) and another LPP Provide Location Information message (which can be referred to as a second LPP Provide Location Information) from the UE 102. The local LMF 120 can generate the location information using the positioning result in the first LPP Provide Location Information and the positioning result in the second LPP Provide Location Information message to obtain a more precise location information.

The components 104, 106, and 120 operate as components of a RAN 130. Thus, in the example configuration of FIG. 1, the UE 102 can access at least two entities that provide location services: one operating in the RAN 130 (i.e., the local LMF 120) and another one operating in the 5GC 110 (i.e., the LMF/E-SMLC 114). In at least some of the implementations, the local LMF 120 and the E-SMLC 114 support the same positioning protocol such as LPP or NRPP. For convenience, the discussion of various systems, protocol stacks, scenarios, flow diagrams, etc. below refers primarily to LPP. However, these techniques are similarly applicable to NRPP and other suitable positioning protocols. Although the examples below refer primarily to EUTRA, NR, and 5GC, generally similar techniques can apply to other radio access and/or core network technologies.

As illustrated in FIG. 1, the UE 102 is equipped with processing hardware 120 that can include one or more general-purpose processors such as central processing units (CPUs) and non-transitory computer-readable memory storing machine-readable instructions executable on the one or more general-purpose processors, and/or special-purpose processing units. The processing hardware 120 in an example implementation includes an LCS controller 152 that generates outbound (uplink) messages related to positioning, processes inbound (downlink) messages related to positioning, and executes various procedures related to positioning.

The LCS controller 152 in some implementations uses LCS configuration 154 which can indicate a preference or priority for RAN-based LCS or CN-based LCS, for example. The UE 102 can receive the LCS configuration 154 from the 5GC 110, the RAN 130, a universal subscriber identity module (USIM), a setting of the operating system of the UE 102, user input, or any other suitable source.

The ng-eNB 104 is equipped with processing hardware 160 that also can include one or more general-purpose processors such as CPUs and non-transitory computer-readable memory storing machine-readable instructions executable on the one or more general-purpose processors, and/or special-purpose processing units. The processing hardware 160 in this implementation includes an LCS message router that 162 that determines where the base station 104 should direct uplink positioning protocol messages and how the base station 104 should format downlink positioning protocol messages. To this end, the LCS message router 162 can use input from an LPP message identifier 164 that determines the type of an LPP message and a NAS message identifier 166 that determines the type of a NAS message. Further, the LCS message router 162 in some implementations or scenarios can receive information from the RRC controller 168 regarding the type and content of an RRC message as well as provide information to the RRC controller 168 regarding the type and content of an outbound RRC message.

Figure 2:
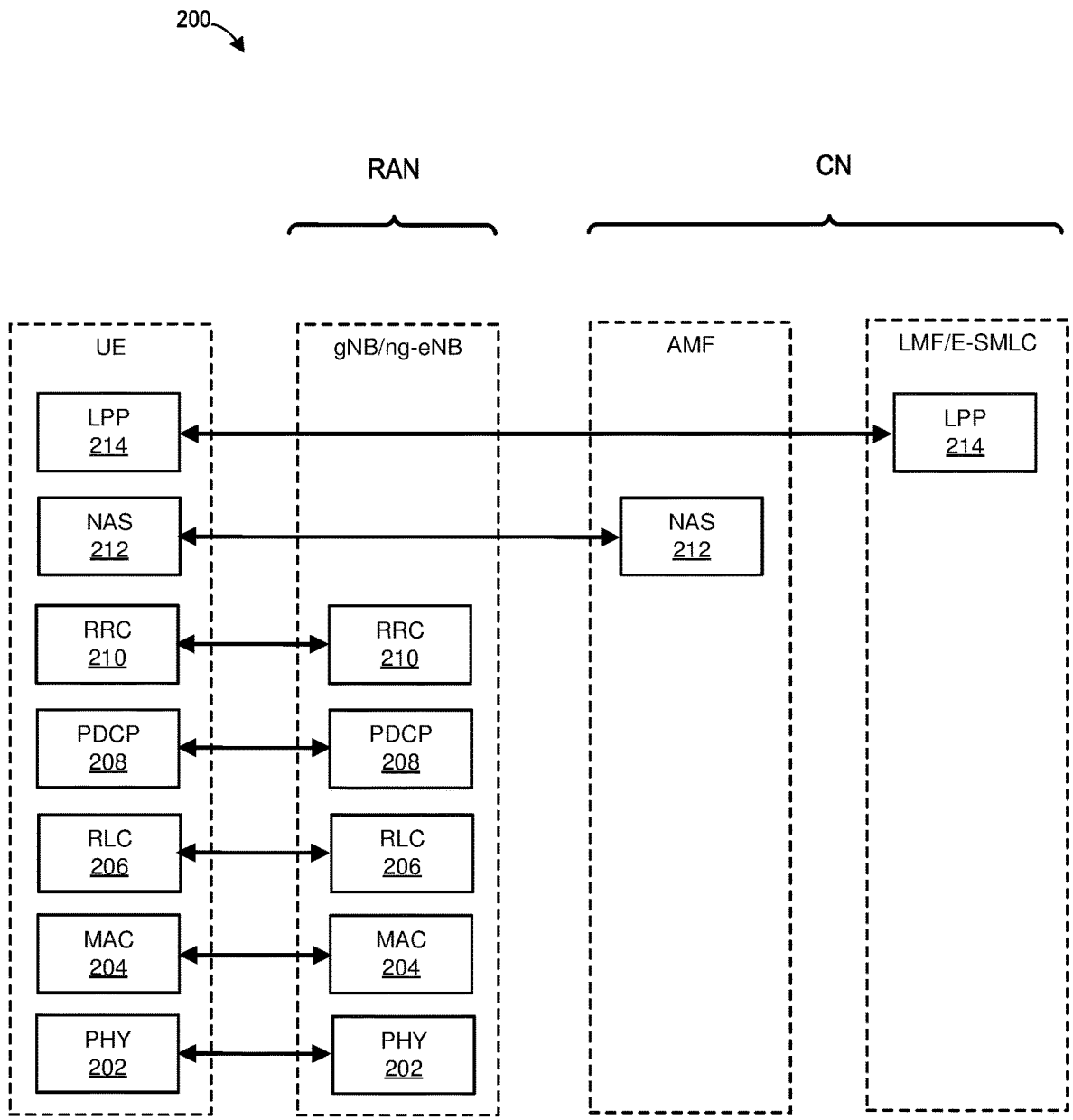
FIG. 2 is a block diagram of a known protocol stack in accordance with which a UE, a base station, and core network can exchange information related to a location service.

Now referring to FIG. 2, in a known wireless communication system, a UE and a gNB/ng-eNB support a physical layer (PHY) 202 of EUTRA or NR. The PHY layer 202 provides transport channels to the Medium Access Control (MAC) 204 sublayer, which in turn provides logical channels to the Radio Link Control (RLC) sublayer 206, and the RLC sublayer provides RLC channels to the Packet Data Convergence Protocol (PDCP) sublayer 208. The sublayer 208 PDCP sublayer provides signaling radio bearers (SRBs) and/or data radio bearers (DRBs) to the radio resource control (RRC) sublayer 210.

The UE and the AMF operating in the core network exchange messages of a non-access stratum (NAS) sublayer 212 via the gNB/ng-eNB, and the UE and the LMF/E-SMLC, also operating in the core network, exchange messages of an LPP layer 214 via the gNB/ng-eNB and the AMF. In other words, the UE and LMF/E-SMLC encapsulate LPP messages in NAS messages, and encapsulate NAS messages in RRC messages. The gNB/ng-eNB according to this architecture simply provides tunneling to the layers 212 and 214, and does not route or otherwise process messages at the layers 212, 214.

Next, FIGS. 3-12 illustrate several examples of protocol architecture according to which the UE 102 and the base station 104 of this disclosure can operate to efficiently support local and/or non-local LCS services, along with the corresponding methods which the UE 102 and the base station 104 can implement.

Figure 3:
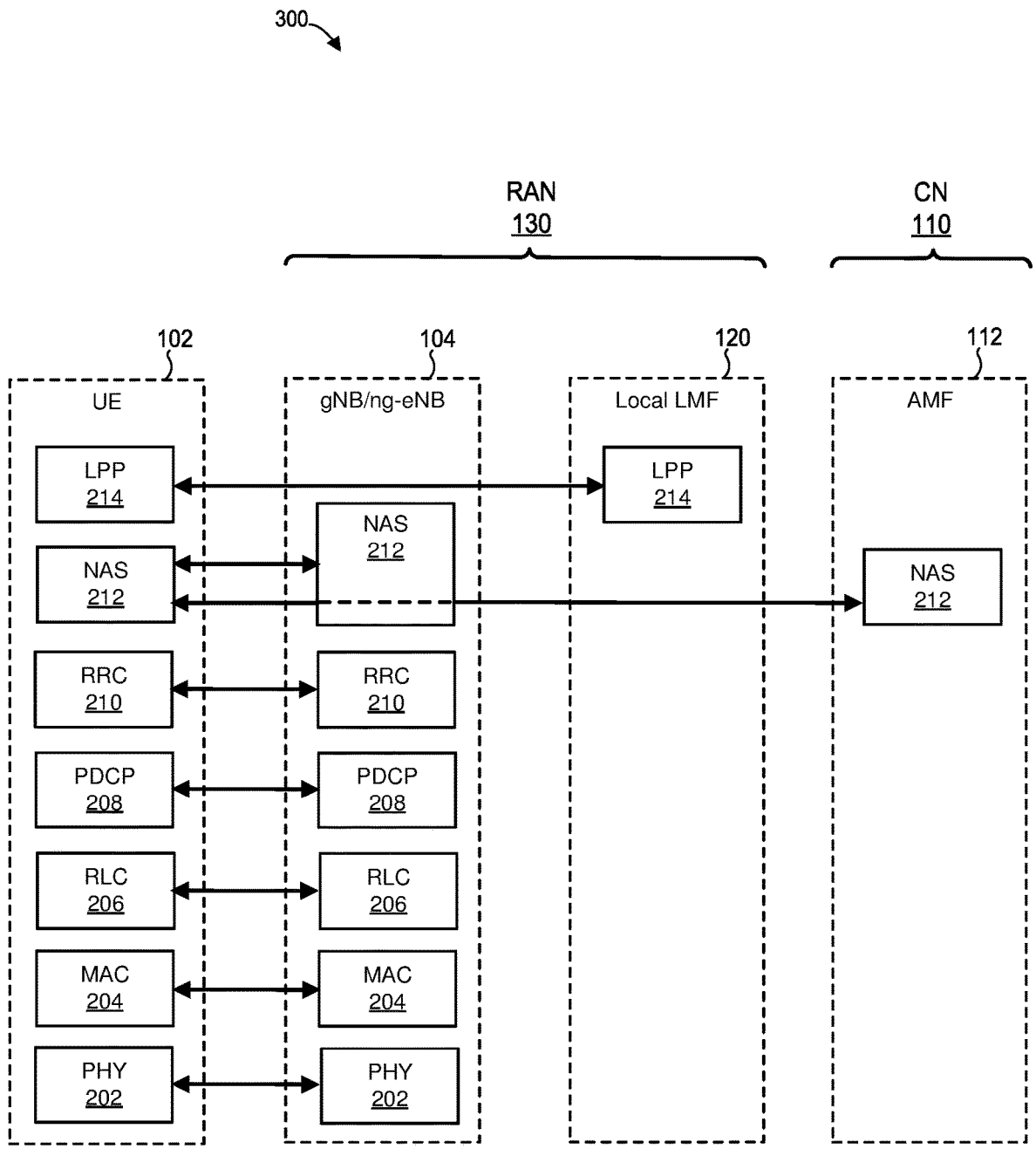
FIG. 3 is a block diagram of an example protocol stack in accordance with which the base station of this disclosure operates to transport LPP messages layered over NAS to a local LMF.

Referring first to FIG. 3, the base station 104 according to a protocol architecture 300 implements at least partial processing capability for the NAS layer 212. In particular, the base station 104 can parse a NAS message to determine whether this message includes an LPP message (without necessarily processing all other information in the NAS message). According to this architecture, the UE 102 generates an LPP message, includes the LPP message in an UL NAS message, includes the resulting NAS message in an UL RRC message, and sends the UL RRC message to the base station 104. As illustrated in FIG. 3, the UE 102 layers the UL RRC message over PDCP, RLC, MAC, and PHY. When the base station 104 receives the UL RRC message, the base station 104 extracts the UL NAS message from the UL RRC message and then extracts the LPP message from the UL message.

The base station 104 then sends the LPP message to the local LMF 120, which processes the LPP message. The local LMF 120 for example can extract the payload by processing the LPP message according to the LPP protocol. In this implementation, the local LMF 120 operates as a node separate from the base station 104, in the RAN 130. Accordingly, to transport the LPP message, the base station 104 sends the LPP message over a network link. In other implementations discussed below, however, the local LMF 120 is co-located with the base station 104, and transporting an LPP message to the local LMF can involve sending the LPP message to another task or software entity using inter-process communication (IPC) techniques, for example.

When the local LMF 120 generates an LPP message for the UE 102, the local LMF 120 sends the LPP message to the base station 104. The base station 104 includes the LPP message in an DL NAS message, includes the DL NAS message in an DL RRC message, and sends the DL RRC message to the UE 102 over the radio interface. Similar to the UL RRC message discussed above, the base station 104 can layer the DL RRC message over PDCP, RLC, MAC, and PHY. The UE 102 receives the DL RRC message, extracts the DL NAS message from the DL RRC message, and extracts the LPP message from the DL NAS message. The UE 102 then processes the LPP message in accordance with the LPP protocol.

However, when the base station 104 extracts a UL NAS message from an UL RRC message and determines that the UL NAS message does not include an LPP message, the base station 104 sends the UL NAS message to the AMF 112. Because it is sufficient for the base station 104 to determine only whether the UL NAS messages includes an LPP message, the base station 104 in this implementation need not necessarily determine the type of non-LPP message the UL NAS message encapsulates.

Generally speaking, protocol architecture 300 supports a low-latency Location Management Function with little impact on the overall architecture.

Figure 4:
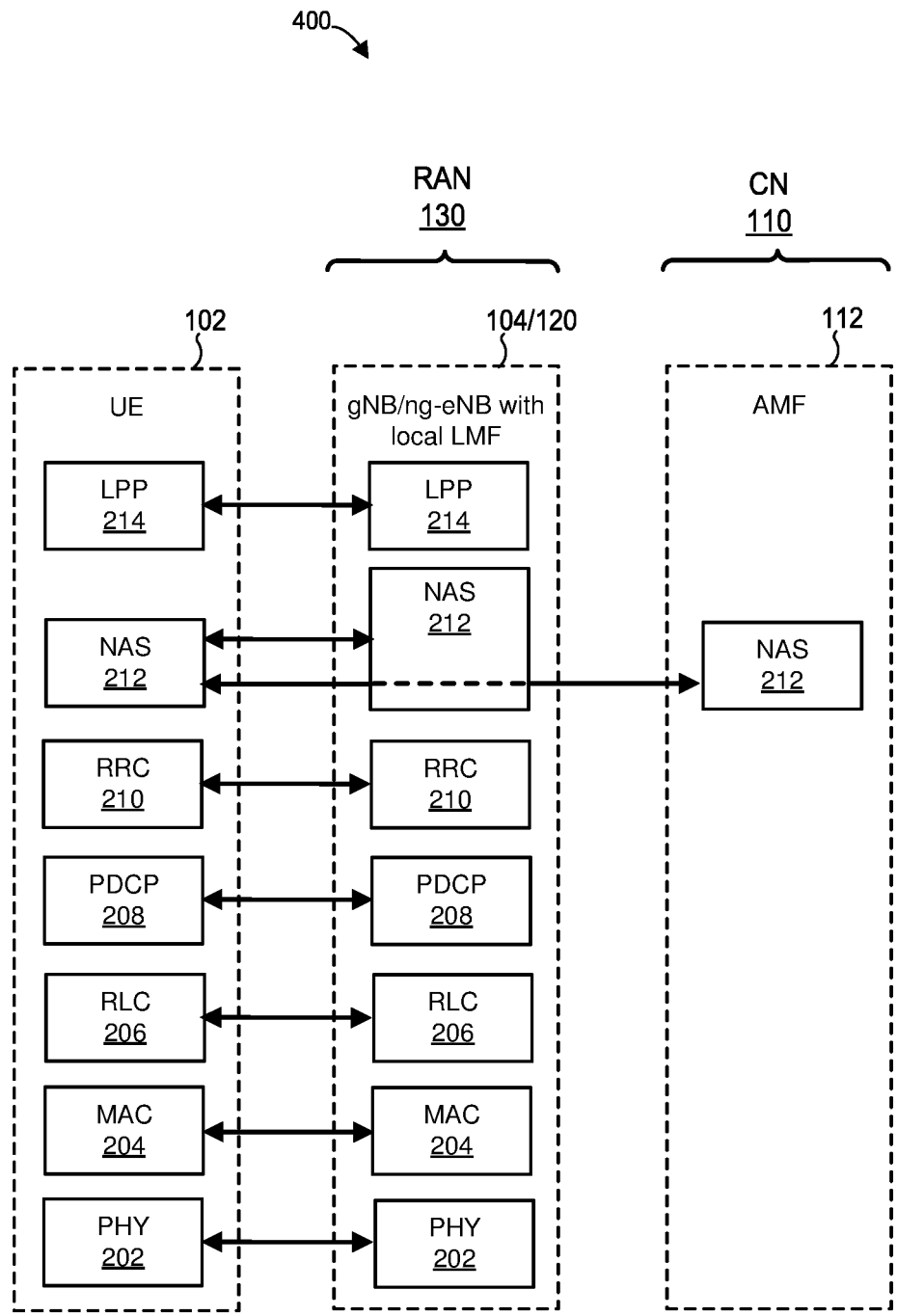
FIG. 4 is a block diagram of an example protocol stack in accordance with which the base station of this disclosure operates to transport LPP messages layered over NAS to a local LMF co-located with the base station.

FIG. 4 illustrates another protocol architecture 400 that is generally similar to the protocol architecture 300, except that here the local LMF 120 and the base station 104 are co-located at the same node and/or device. In this case, the base station 104 similarly extracts the UL NAS message from the UL RRC message, extracts the LPP message from the UL message, and sends the LPP message to the local LMF 120 using an appropriate IPC mechanism, for example.

Next, FIGS. 5-7C illustrate several example methods which the UE 102 or the base station 104 can implement to operate according to the protocol architecture of FIGS. 3 and 4.

Figure 5:
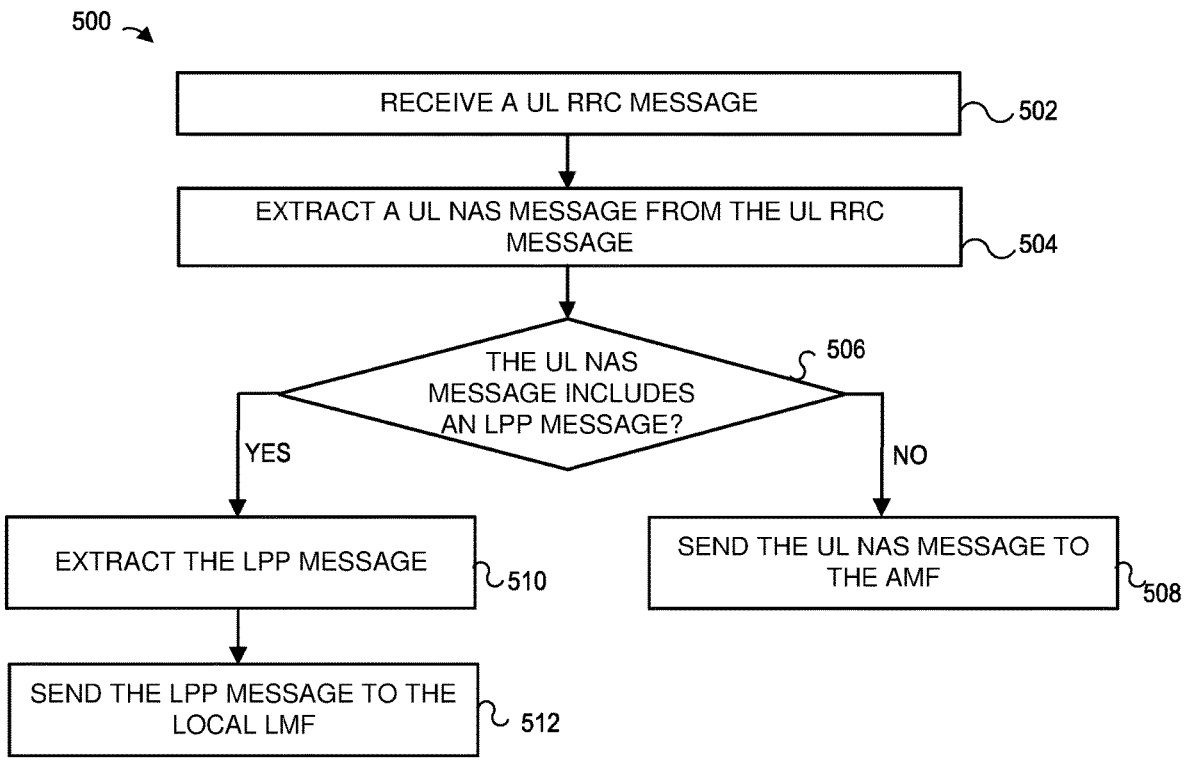
FIG. 5 is a flow diagram of example method for transporting an LPP message layered NAS in the uplink direction to a local LMF or an AMF, which can be implemented in the base station of FIG. 1.

Referring first to FIG. 5, the method 500 begins at block 502, where the base station 104 receives a UL RRC message from the UE 102 via the radio interface. As illustrated in FIGS. 3 and 4, the UL RRC message can be layered in order over PDCP, RLC, MAC, and PHY.

At block 504, the base station 104 extracts a UL NAS message from the received UL RRC message. The base station 104 to this end can process the RRC header, determine that the UL RRC encapsulates the UL NAS message, and remove the header, footer, etc. from the RRC message. More generally, the base station 104 can implement any suitable message processing techniques to extract a NAS message from a lower-layer message. As indicated above, the base station 104 need not necessarily support full NAS functionality of the AMF or specified by the corresponding standard (e.g., 3GPP technical specification 24.501). Referring back to FIG. 1, the base station 104 instead can include a NAS message identifier 166 that determines whether the UL NAS message includes an LPP message. In some implementations, the base station 104 also can implement functionality for generating downlink (DL) NAS messages to transport LPP messages from the local LMF 120 to the UE 102, as discussed in more detail below.

Referring again to FIG. 5, the base station 104 at block 506 determines whether the UL NAS message includes an LPP message. The UL NAS message in some implementations is a dedicated message defined specifically to carry an LPP message. More particularly, the dedicated NAS message can have a specific NAS message type to identify a type of message which carries or encapsulates an LPP message only (i.e., which cannot carry any other types of messages). The dedicated NAS message also can include a field that includes an LPP message. The dedicated message (or the NAS message type) in this implementation indicates to the base station 104 that the UL NAS message includes an LPP message. In another implementation or scenario, the UL NAS message includes an information element (IE) that indicates whether the UL NAS message includes an LPP message. For example, the UL NAS message can be a UL NAS TRANSPORT that can carry an LPP message or another higher-layer message.

Alternatively, the RRC controller 168 operating in the base station 104 (see FIG. 1) relies on the RRC layer to determine how the base station 140 should process the received UL RRC message. The UL RRC message can include an indication of whether the UL NAS message carries an LPP message. For example, the RRC message can be a dedicated message defined specifically to carry a UL NAS message that in turn carries an LPP message (i.e., carry an LPP message layered over NAS). Generally similar to the dedicated NAS message discussed above, the dedicated RRC message can have a specific RRC message type to identify a type of message which carries or encapsulates an LPP message only (i.e., which cannot carry any other types of messages). The dedicated message (or the RRC message type) in this implementation indicates to the base station 104 that the RRC message includes an LPP message layered over NAS.

In another implementation or scenario, the UL RRC message includes an IE that indicates whether the UL RRC message includes an LPP message layered over NAS. The UL RRC message in this case can be ULInformationTransfer, for example.

Referring again to FIG. 5, the flow proceeds to block 508 when the base station 104 determines that the UL NAS message does not include an LPP message. Otherwise, when the base station 104 determines that the UL NAS message includes an LPP message, the flow proceeds to block 510.

At block 508, the base station 104 sends the UL NAS message to the AMF 102. To this end, the base station 104 can remove the information at or below the RRC layer 210, and encapsulate the UL NAS message in a protocol that supports message transport over the NG interface, for example. In other words, the base station 104 transmits at least some of the data (e.g., user plane data or control plane information or messages) included in the received UL RRC message to the AMF 102.

On the other hand, at block 510, the base station 104 extracts the LPP message from the UL NAS message and then sends the UL NAS message to the local LMF 120, at block 512. Depending on whether the local LMF 120 is disposed in a separate node (see FIG. 3) or co-located with the base station 104 (see FIG. 4), the base station 104 uses the protocol stack of a communication link that couples the base station 104 to the local LMF 120 or an appropriate mechanism for transferring messages within the same node.

In some implementations consistent with the protocol architecture of FIGS. 3 and 4, the UE 102 can operate similar to a prior art UE illustrated in FIG. 2. Thus, the UE 102 can send LPP messages in the uplink direction and receive LPP messages in the downlink direction regardless of whether the base station 104 is implemented as illustrated in FIG. 2, 3, or 4, and regardless of whether the RAN 130 supports local LCS functionality. In other implementations, however, the UE 102 can implement additional functionality to address LPP messages specifically to the local LMF 120 or the non-local LMF/E-SMLC 114 (directly or via the AMF 112, for example).

Figure 6A:
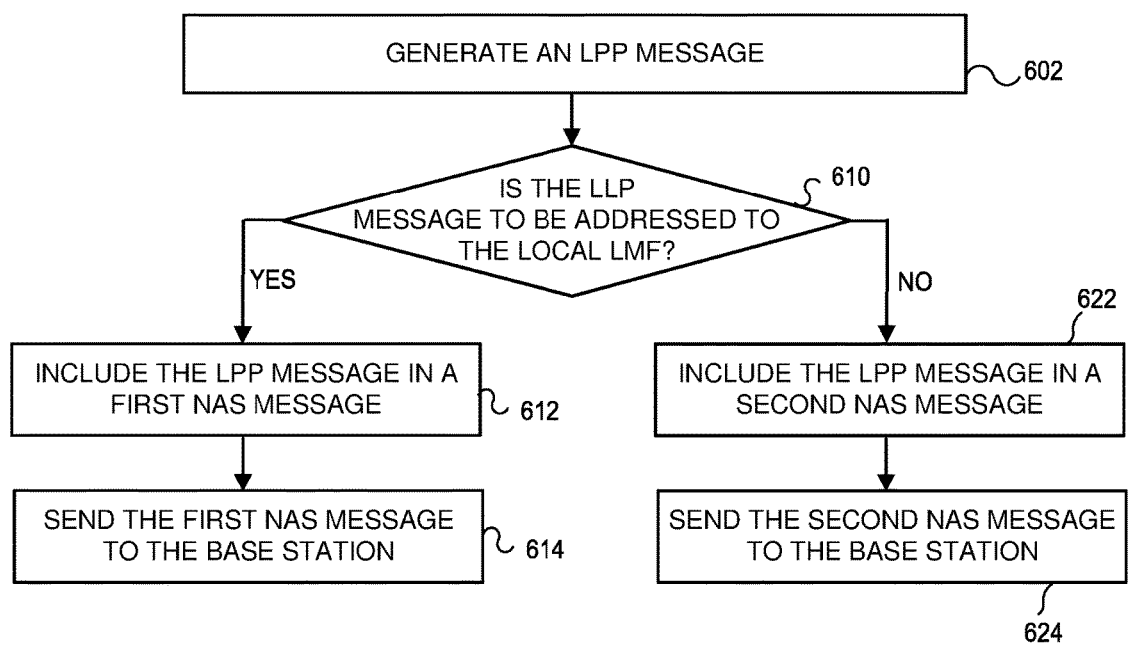
FIG. 6A is a flow diagram of example method for generating an LPP message for transmission to a local LMF or a remote node using different NAS messages, which can be implemented in the UE of FIG. 1.

One such technique is illustrated in FIG. 6A. The LCS controller 152 (see FIG. 1) or another suitable component of the UE 102 can implement a method 600 for generating an LPP message for transmission to a local LMF or a remote node.

The method 600 begins at block 602, when the UE 102 generates an LPP message. Next, at block 610, the UE 102 determines whether the UE 102 should address the LPP message to a RAN-based LCS entity (e.g., the local LMF 120) or a CN-based LCS entity (e.g., the non-local LMF/E-SMLC 114). If the LPP message is for a RAN-based LCS entity, the flow proceeds to block 612. Otherwise, if the LPP message is for a CN-based LCS entity, the flow proceeds to block 622.

At block 612, the UE 102 includes the LPP message in a UL NAS message of a first type. For example, the UE 102 can include the LPP message in a UL NAS message of the type specifically dedicated to carrying an LPP message. The UE 102 then sends the UL NAS message to the base station 104, at block 614. The UE 102 in one implementation layers the UL NAS message over RRC, PDCP, RLC, MAC, and PHY.

At block 622, the UE 102 includes the LPP message in a UL NAS message of a second type. For example, the UE 102 can include the LPP message in a UL NAS TRANSPORT message which, as discussed above, can be used to also carry messages unrelated to LCS. At block 624, the UE 102 then sends the UL NAS message to the base station 104. The UE 102 similarly can layer the UL NAS message over RRC, PDCP, RLC, MAC, and PHY.

Figure 6B:
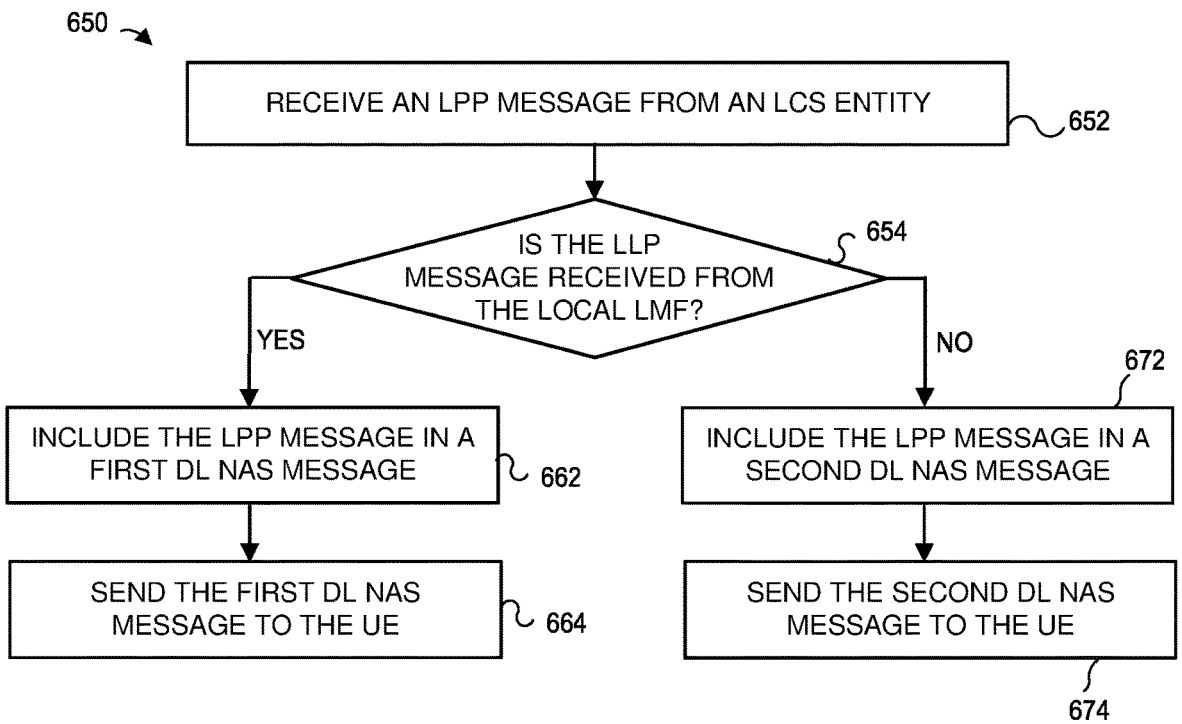
FIG. 6B is a flow diagram of an example method for transporting an LPP message from an LCS entity in the downlink direction to a UE using different NAS messages, which can be implemented in the base station of FIG. 1.

FIG. 6B illustrates an example method 650 which the base station 104 (e.g., the LCS message router 162) can implement to transport LPP messages in the downlink direction. At block 652, the base station 104 receives an LPP message from a RAN-based LCS entity or a CN-based LCS entity. Next, at block 654, the base station 104 determines whether the LPP message arrived from a RAN-based LCS entity, e.g., the local LMF 120. If the LPP message has arrived from the RAN-based LCS entity, the flow proceeds to block 662; otherwise, the flow proceeds to block 672.

At block 662, the base station 104 includes the LPP message in a DL NAS message of a first type. For example, the base station 104 can include the LPP message in a DL NAS message of the type specifically dedicated to carrying an LPP message. The base station 104 then sends the DL NAS message to the UE 102, at block 664. The base station 104 in one implementation layers the DL NAS message over RRC, PDCP, RLC, MAC, and PHY.

At block 672, the base station 104 includes the LPP message in a DL NAS message of a second type. For example, the base station 104 can include the LPP message in a DL NAS TRANSPORT message which, as discussed above, can be used to also carry messages unrelated to LCS. At block 674, the base station 104 sends the DL NAS message to the UE 102. The base station 104 similarly can layer the DL NAS message over RRC, PDCP, RLC, MAC, and PHY.

Figure 6C:
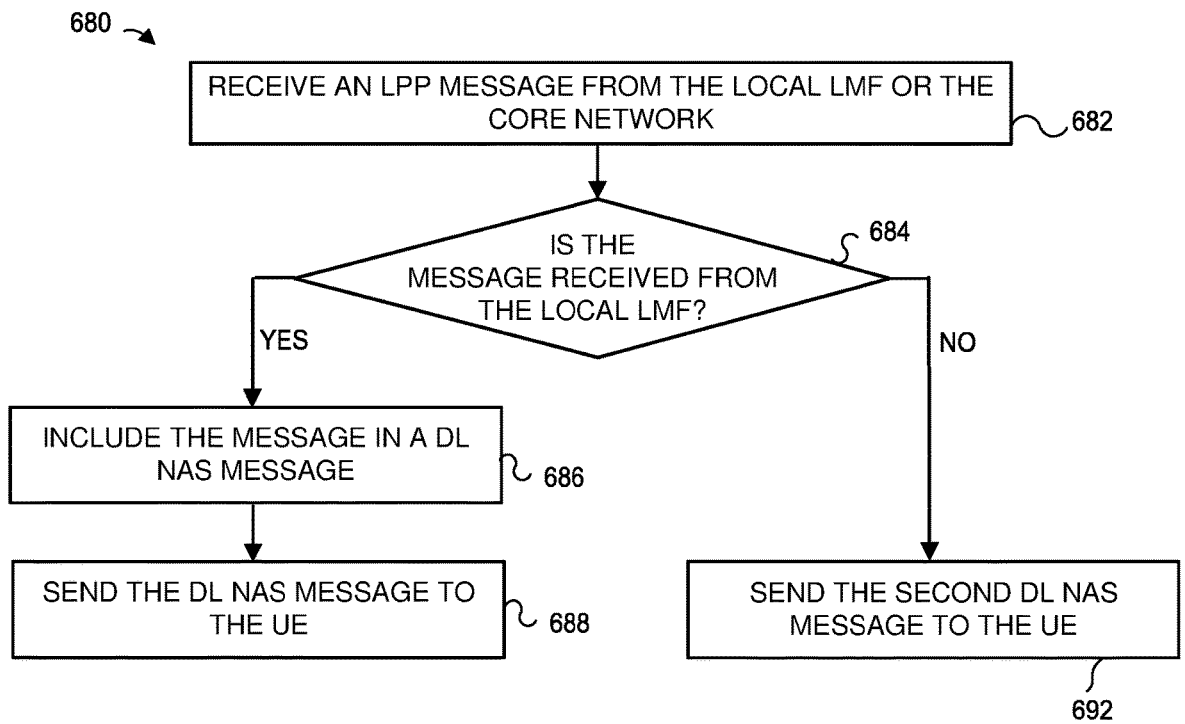
FIG. 6C is a flow diagram of an example method for transporting a message from a local LMF or a core network in the downlink direction to a UE, which can be implemented in the base station of FIG. 1.

FIG. 6C illustrates an example method 680 which the base station 104 can implement to transport messages from a local LMF and a core network in the downlink direction. At block 682, the base station 104 receives a message from the local LMF (e.g., the local LMF 120) or the core network (e.g., the 5GC 110). Next, at block 684, the base station 104 determines whether the message arrived from the local LMF. If the message has arrived from the local LMF (i.e., the message is an LPP message), the flow proceeds to block 686; otherwise (i.e., the message is a DL NAS message from the core network), the flow proceeds to block 692. The DL NAS message can be a 5G system mobility management (5GMM) message or a 5G system session management (5GSM) message, for example. The 5GMM message can be a REGISTRATION ACCEPT, SERVICE ACCEPT, SERVICE REJECT, IDENTITY REQUEST, CONFIGURATION UPDATE COMMAND, AUTHENTICATION REQUEST, SECURITY MODE COMMAND, DEREGISTRATION REQUEST, NOTIFICATION, 5GMM STATUS, DEREGISTRATION ACCEPT or DL NAS TRANSPORT. In some cases, the DL NAS TRANSPORT can include an LPP message from non-local LMF/E-SMLC 114. In other cases, the DL NAS TRANSPORT can include information (e.g., short message service message) other than the LPP message. The 5GSM message can be a PDU SESSION ESTABLISHMENT ACCEPT, PDU SESSION AUTHENTICATION REQUEST, PDU SESSION MODIFICATION ACCEPT, PDU SESSION MODIFICATION COMMAND, PDU SESSION RELEASE REQUEST, PDU SESSION RELEASE COMPLETE or 5GSM STATUS.

At block 686, the base station 104 includes the message in a DL NAS message. The base station 104 then sends the DL NAS message to the UE 102, at block 688. The base station 104 in one implementation layers the DL NAS message over RRC, PDCP, RLC, MAC, and PHY. In one example, the DL NAS message can be a DL NAS TRANSPORT message. In another example, the DL NAS message can be a DL NAS message of a type specifically dedicated to carry an LPP message from the local LMF.

At block 692, the base station 104 sends the message to the UE 102. The base station 104 similarly can layer the message over RRC, PDCP, RLC, MAC, and PHY.

Figure 7A:
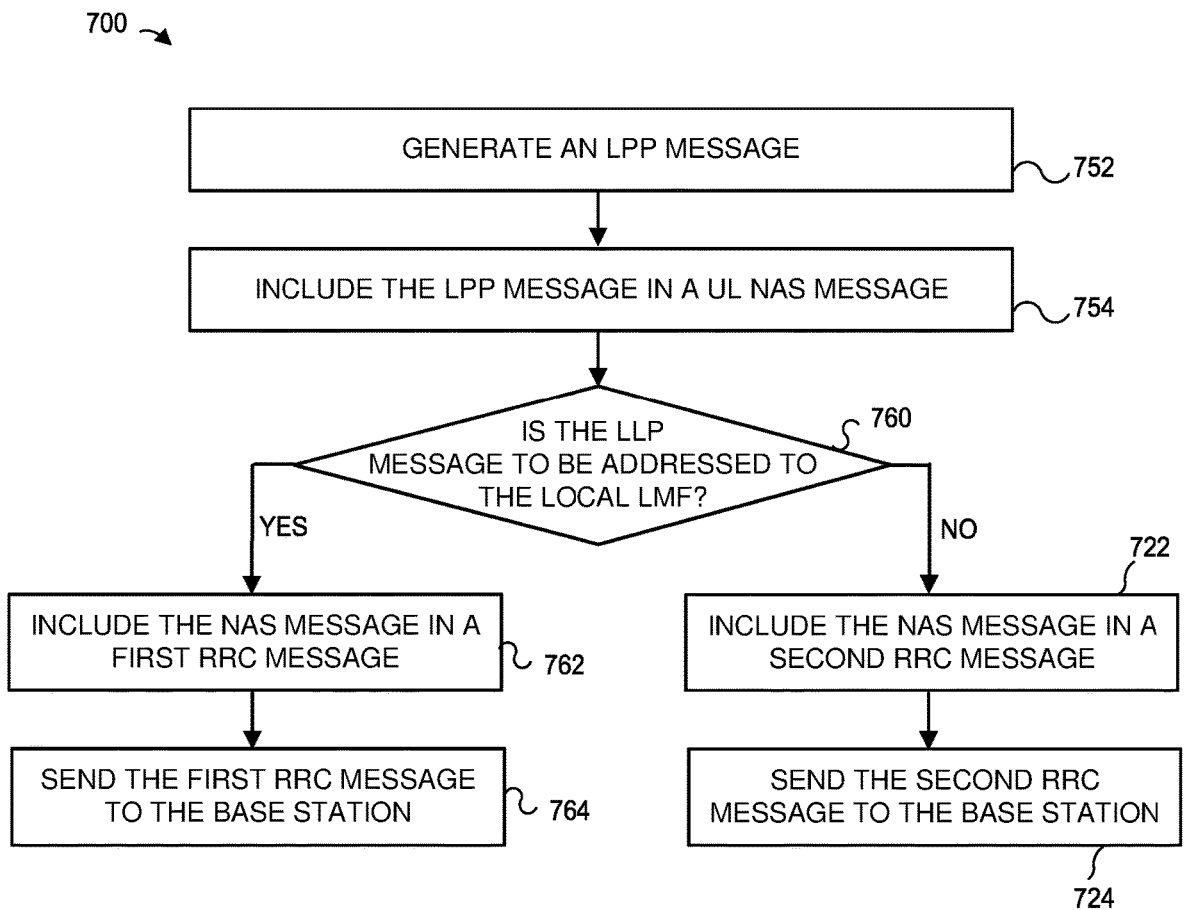
FIG. 7A is a flow diagram of another example method for generating an LPP message for transmission to a local LMF or a remote node using different RRC messages, which can be implemented in the UE of FIG. 1.

As another alternative to the method of FIG. 6A, the LCS controller 152 or another suitable component of the UE 102 can implement a method 700 of FIG. 7A for generating an LPP message for transmission to a local LMF or a remote node. According to the method 700, the UE 102 indicates to the base station 104 where the base station 104 should send the LPP message, similar to the method 600. However, unlike the method 600, the method 700 is based on selecting a type of a UL RRC message rather than the type of a UL NAS message.

In particular, the method 700 begins at block 702, when the UE 702 generates an LPP message. Similar to the determination at block 610 discussed above, the UE 102 at block 710 determines whether the UE 102 should address the LPP message to a RAN-based LCS entity (e.g., the local LMF 120) or a CN-based LCS entity (e.g., the non-local LMF/E-SMLC 114). If the LPP message is for a RAN-based LCS entity, the flow proceeds to block 712. Otherwise, if the LPP message is for a CN-based LCS entity, the flow proceeds to block 722.

At block 712, the UE 102 includes the LPP message in a UL RRC message of a first type. For example, the UE 102 can include the LPP message in a UL RRC message of the type specifically dedicated to carrying an LPP message. The UE 102 then sends the UL RRC message to the base station 104, at block 714. The UE 102 can layer the UL RRC message over PDCP, RLC, MAC, and PHY.

At block 722, the UE 102 includes the LPP message in a UL message of a second type. For example, the UE 102 can include the LPP message in a ULInformationTransfer message which also can be used to carry messages unrelated to LCS. At block 724, the UE 102 then sends the UL NAS message to the base station 104. The UE 102 can layer the UL RRC message over PDCP, RLC, MAC, and PHY.

Figure 7B:
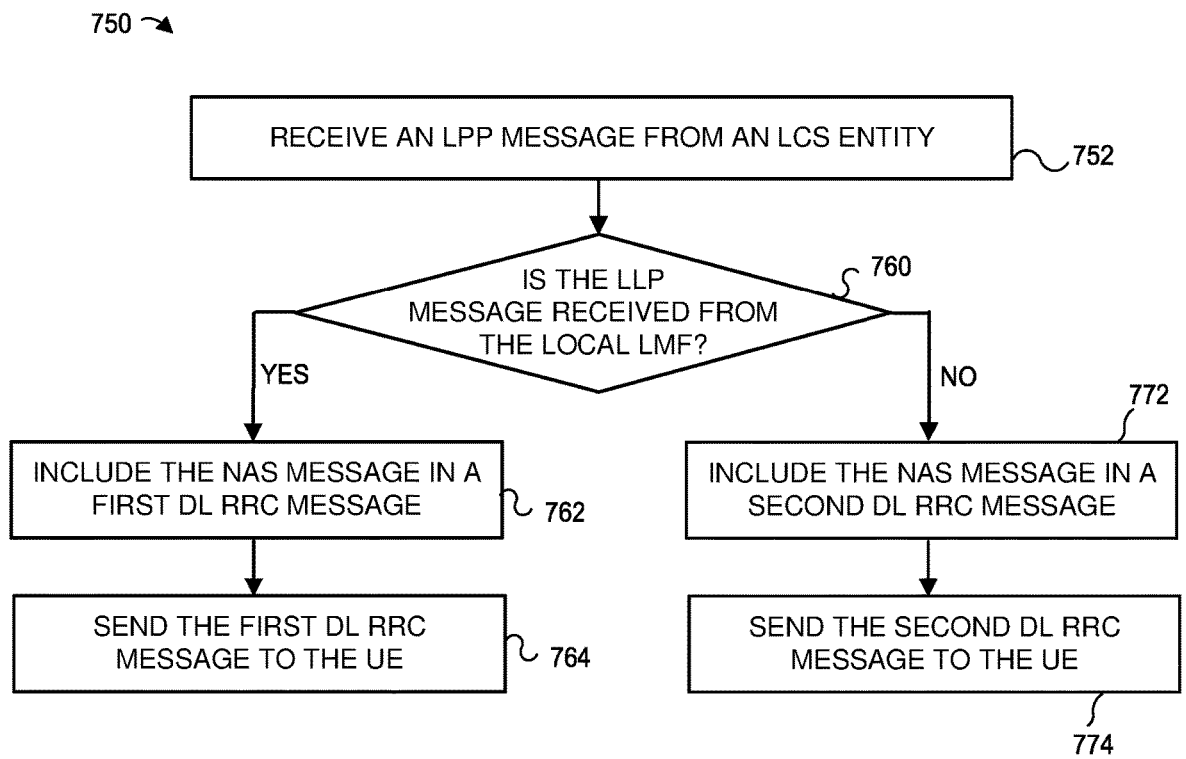
FIG. 7B is a flow diagram of an example method for transporting an LPP message from an LCS entity in the downlink direction to a UE using different RRC messages, which can be implemented in the base station of FIG. 1.

FIG. 7B illustrates an example method 750 which the base station 104 (e.g., the LCS message router 162) can implement to transport LPP messages in the downlink direction using different RRC messages. At block 752, the base station 104 receives an LPP message from an LCS entity, which can be the local LMF 120 or another suitable RAN-based LCS entity, or the non-local LMF/E-SMLC 114 or another suitable CN-based LCS entity. If the LPP message arrives from a RAN-based LCS entity such as the local LMF 120 (block 760), the flow proceeds to block 762. Otherwise, if the LPP message arrives from a CN-based LCS entity, the flow proceeds to block 772.

At block 762, the base station 104 includes the LPP message in a DL RRC message of a first type. For example, the base station 104 can include the LPP message in a DL RRC message of the type specifically dedicated to carrying an LPP message. The base station 104 then sends the DL RRC message to the UE 102, at block 764. The base station 104 can layer the DL RRC message over PDCP, RLC, MAC, and PHY.

At block 772, the base station 104 includes the LPP message in a DL RRC message of a second type. For example, the base station 104 can include the LPP message in a DLInformationTransfer message which also can be used to carry messages unrelated to LCS. At block 774, the base station 104 sends the DL RRC message to the UE 102. The base station 104 can layer the DL RRC message over PDCP, RLC, MAC, and PHY, for example.

Figure 7C:
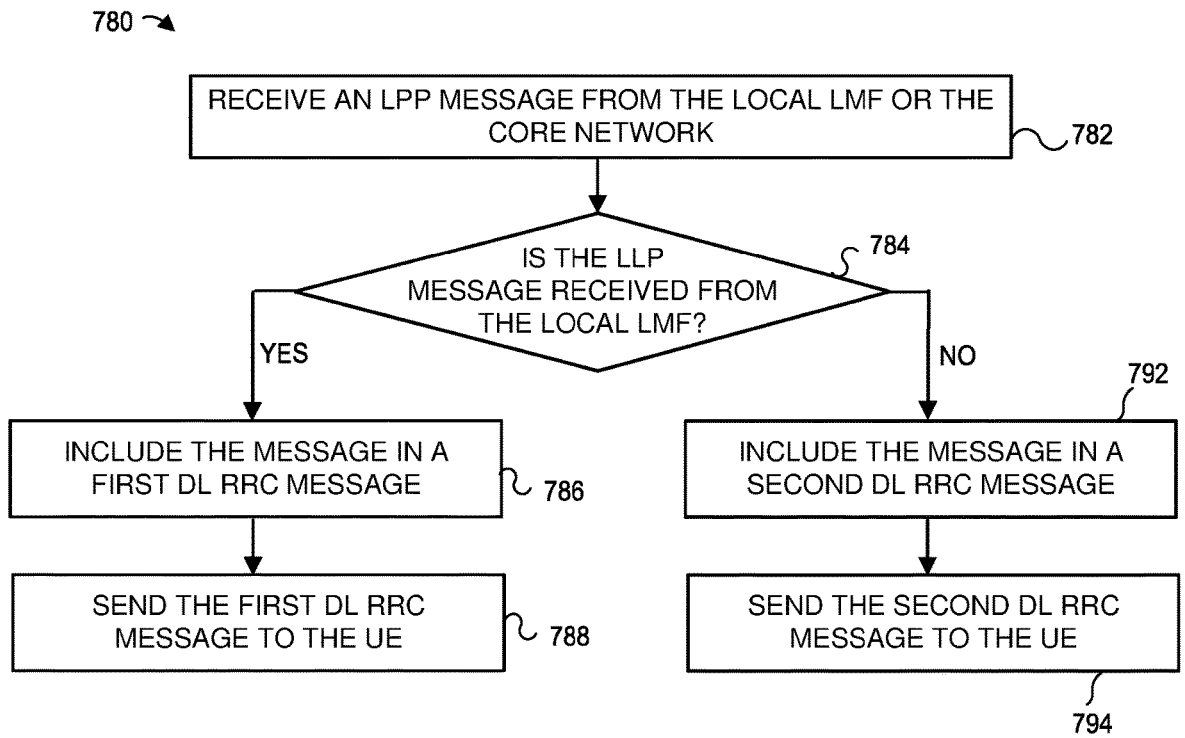
FIG. 7C is a flow diagram of an example method for transporting messages from a local LMF or a core network in the downlink direction to a UE, which can be implemented in the base station of FIG. 1.

FIG. 7C illustrates an example method 780 which the base station 104 can implement to transport messages from a local LMF and a core network in the downlink direction. At block 782, the base station 104 receives a message from the local LMF (e.g., the local LMF 120) or the core network (e.g., the 5GC 110). Next, at block 784, the base station 104 determines whether the message arrived from the local LMF. If the LPP message arrives from the local LMF (i.e., the message is an LPP message), the flow proceeds to block 786. Otherwise (i.e., the message is a DL NAS message from the core network), the flow proceeds to block 792. The DL NAS message is as described in FIG. 6C.

At block 786, the base station 104 includes the LPP message in a DL RRC message of a first type. The base station 104 then sends the first DL RRC message to the UE 102, at block 788. The base station 104 can layer the UL RRC message over PDCP, RLC, MAC, and PHY. In some implementations, the first DL RRC message can be a DL RRC message of a type specifically dedicated to carrying an LPP message from the local LMF. As a result, the UE 102 determines (or knows) the first DL RRC message carries the LPP message because the received DL RRC message is a DL RRC message of the first type. Then the UE 102 extracts the LPP message from the DL RRC message and processes the LPP message according to the LPP protocol. In other implementations, the first DL RRC message can be an DL RRC message (e.g., DLInfoformationTransfer) which includes a specific indicator (i.e., an RRC field or an RRC IE) indicating the LPP message is contained in the DL RRC message. As a result, the UE 102 determines the first DL RRC message carries the LPP message according to the specific indicator, extracts the LPP message from the DL RRC message and processes the LPP message according to the LPP protocol.

At block 792, the base station 104 includes the message (i.e., the DL NAS message) in a DL RRC message of a second type. At block 794, the base station 104 sends the DL RRC message of the second type to the UE 102. The base station 104 can layer the second DL RRC message over PDCP, RLC, MAC, and PHY, for example. In some implementations, the second DL RRC message can be a DL RRC message of a type specifically dedicated to carrying a DL NAS message. For example, the DL RRC message is an DLInformationTransfer message. In this case, the second DL RRC message does not have the specific indicator as the first DL RRC message. As a result, the UE 102 determines (or knows) the second DL RRC message carries the DL NAS message since the second DL RRC message is the DL RRC message of the type specifically dedicated to carrying a DL NAS message. Then the UE 102 processes the DL NAS message according to the NAS protocol.

Figure 8:
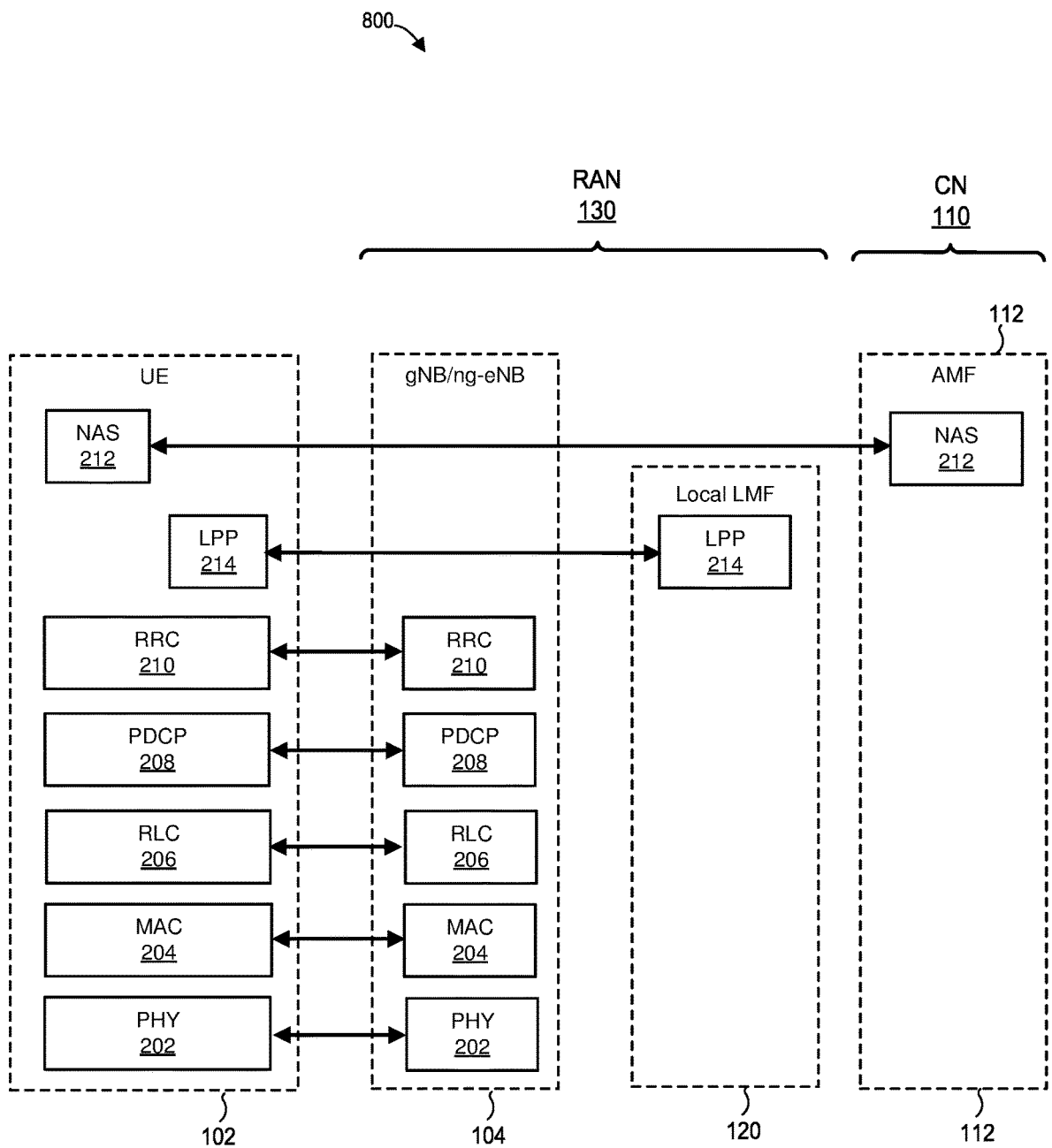
FIG. 8 is a block diagram of an example protocol stack in accordance with which the base station of this disclosure operates to transport LPP messages layered directly over RRC to a local LMF.

Next, FIG. 8 illustrates another protocol architecture 800 according to which the UE 102 can layer LPP messages directly over the RRC layer 214, without relying on the NAS layer, and the base station 104 accordingly can transport such messages in the uplink and downlink directions. Accordingly, the base station 104 can provide a low-latency Location Management Function without the need to implement NAS protocols.

In particular, the UE 102 according to this protocol architecture generates an LPP message and directly layers the LPP message over the RRC layer 210. The resulting UL RRC message thus is free of an intermediate layer (e.g., the NAS layer 212). In other words, the UL RRC message directly encapsulates the LPP message. The UE 102 then sends the UL RRC message to the base station 104. As illustrated in FIG. 8, the UL 102 layers the UL RRC message over PDCP, RLC, MAC, and PHY. When the base station 104 receives the UL RRC message, the base station 104 extracts the LPP message from the UL RRC message. The base station 104 then sends the LPP message to the local LMF 120, which processes the LPP message.

In the downlink direction, the local LMF 120 generates an LPP message and sends the LPP message to the base station 104. The base station 104 layers the LPP messages over a DL RRC message and sends the DL RRC message to the UE 102 over the radio interface. The base station 104 layers the DL RRC message over PDCP, RLC, MAC, and PHY. After the UE 102 receives the DL RRC message, the UE 102 processes the DL RRC message according to the RRC layer 210 and extracts the LPP message.

However, when UE 102 layers a NAS message over RRC, the base station 104 receives a UL RRC message, determines that the UL RRC message includes a UL NAS message, and sends the UL NAS message to the AMF 112 of the CN 110. When the base station 104 receives a DL NAS message from the AMF 112, the base station 104 layers the DL NAS message over RRC and sends the resulting DL RRC message to the UE 102.

In the example of FIG. 8, the local LMF 120 operates in the RAN 130 but in a node separate from the base station 104. In another example protocol architecture 900 depicted in FIG. 9, the local LMF 120 and the base station 104 are co-located. Accordingly, the base station 104 sends LPP messages to the local LMF 120, and receives LPP messages from the local LMF 120, using any suitable IPC techniques.

Figure 9:
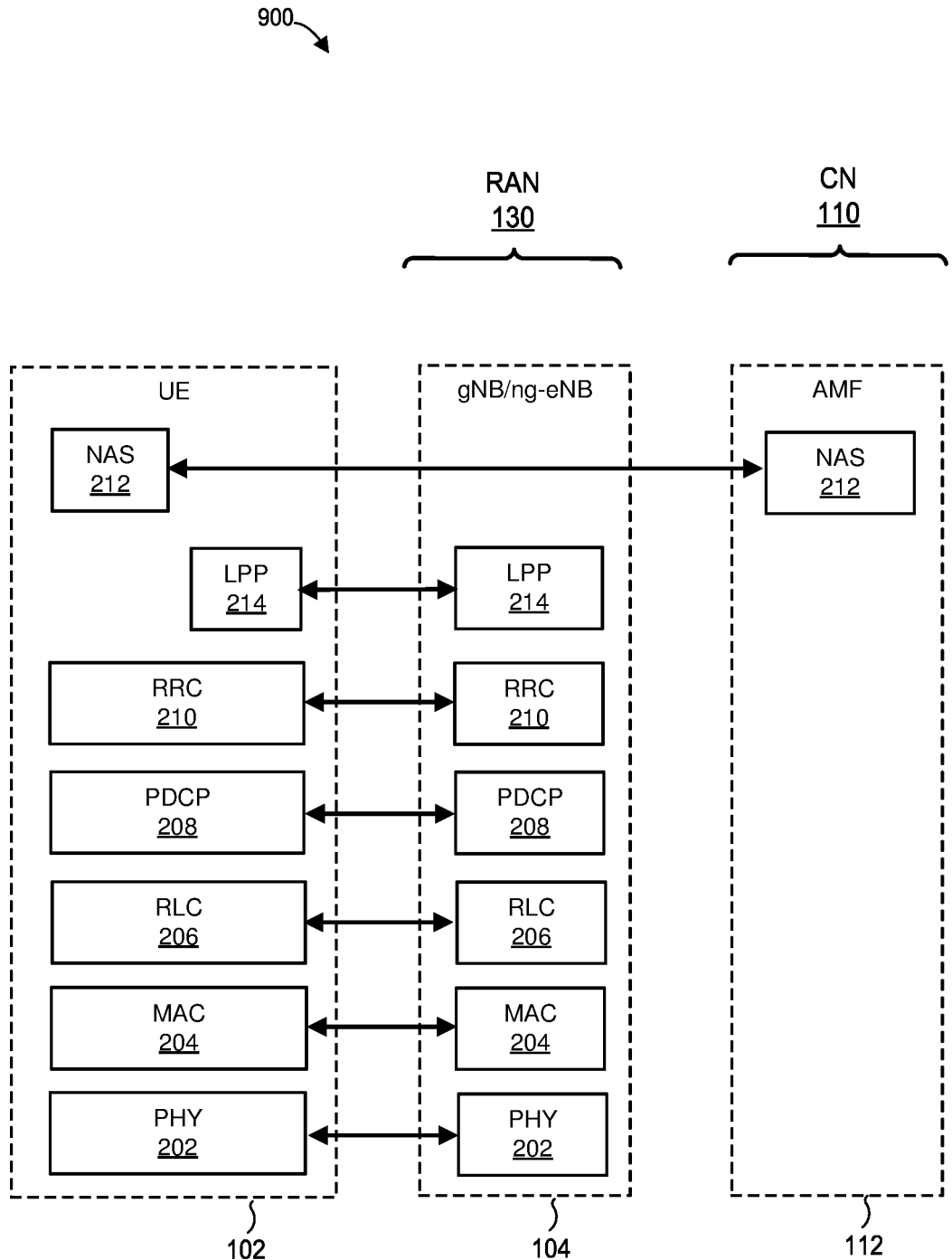
FIG. 9 is a block diagram of an example protocol stack in accordance with which the base station of this disclosure operates to transport LPP messages layered directly over RRC to a local LMF co-located with the base station.

When operating according to the protocol architecture of FIGS. 8 and 9, the UE 102 in some implementations supports not only layering LPP directly over RRC but also layering LPP over RRC via an intermediate layer (e.g., the NAS layer 212). The UE 102 in these implementations can operate according to the protocol architectures of FIGS. 2-7 as well as FIGS. 8-9. This allows the UE 102 to obtain LCS services when only RAN-based LCS is available, when only CN-based LCS is available, or when both RAN-based LCS and CN-based LCS are available. In the latter case, the UE 102 can determine whether it should utilize RAN-based or CN-based LCS based on the configuration of the UE 102, the type of LCS procedure the UE 102 wishes to perform, an indication of which LCS appears to provide a more reliable and/or quicker information, etc.

Figure 10A:
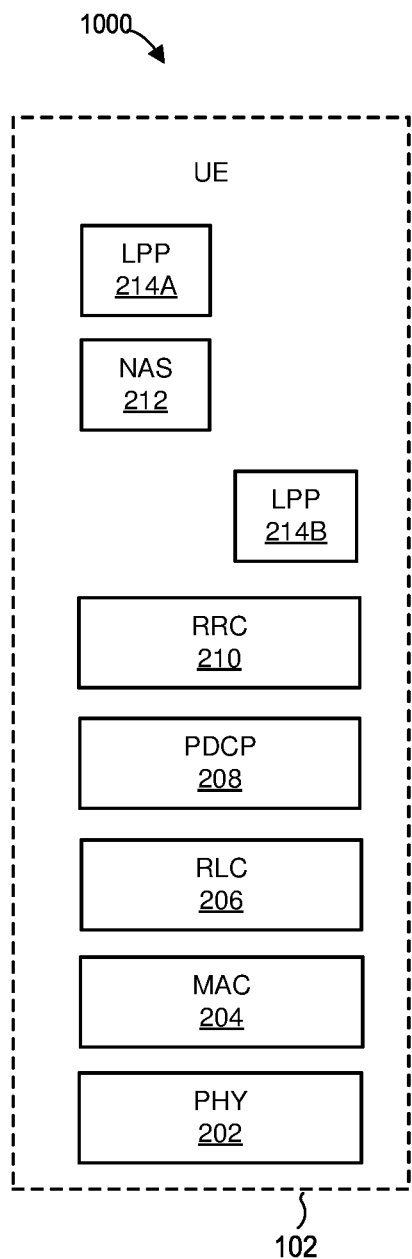
FIG. 10A is a block diagram of an example protocol stack of UE that can operate in the wireless communication network of FIG. 1, with two LPP modules for support different respective transport mechanisms.

FIG. 10A is a block diagram of an example protocol stack 1000 which the UE 102 can implement to support both RAN-based and CN-based LCS. In this implementation, the UE 102 implements an LPP module (or task) 214A that layers outbound LPP messages over NAS and extracts inbound LPP messages from DL NAS messages, and an LPP module 214B that layers outbound LPP messages directly over RRC and extracts inbound LPP messages from DL RRC messages. The LPP module 214A can communicate with the non-local LMF/E-SMLC 114, and the LPP module 214B can communicate with the local LMF 120. In this implementation, each of the LPP modules 214A, 214B can operate independently of each other using separate contexts. In another implementation, the LPP modules 214A and 214B can cooperate to perform certain LCS procedures.

In some implementations, the LPP modules 214A and 214B support the same set of LPP functions. In other implementations, the LPP modules 214A and 214B support different sets of functions. Further, some of the functions the LPP modules 214A, 214B support have different implementations to account for the differences between RAN-based LCS and CN-based LCS.

Figure 10B:
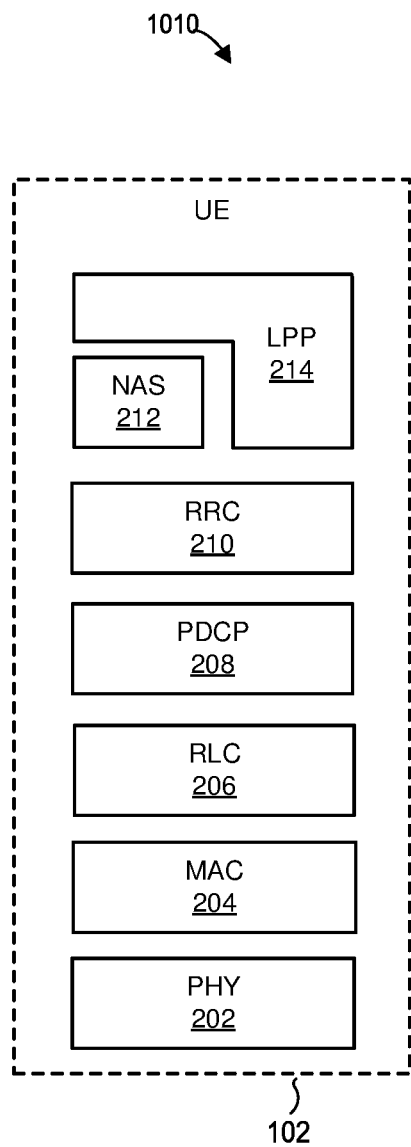
FIG. 10B is a block diagram of an example protocol stack of UE that can operate in the wireless communication network of FIG. 1, with a single LPP module that supports two different respective transport mechanisms.

FIG. 10B is a block diagram of another example protocol stack 1010 which the UE 102 can implement to support both RAN-based and CN-based LCS. In this implementation, the UE 102 implements a single LPP module 214 that layers some outbound LPP messages over NAS and extracts some inbound LPP messages from DL NAS messages, and layers other outbound LPP messages directly over RRC and extracts other inbound LPP messages from DL RRC messages.

Figure 11:
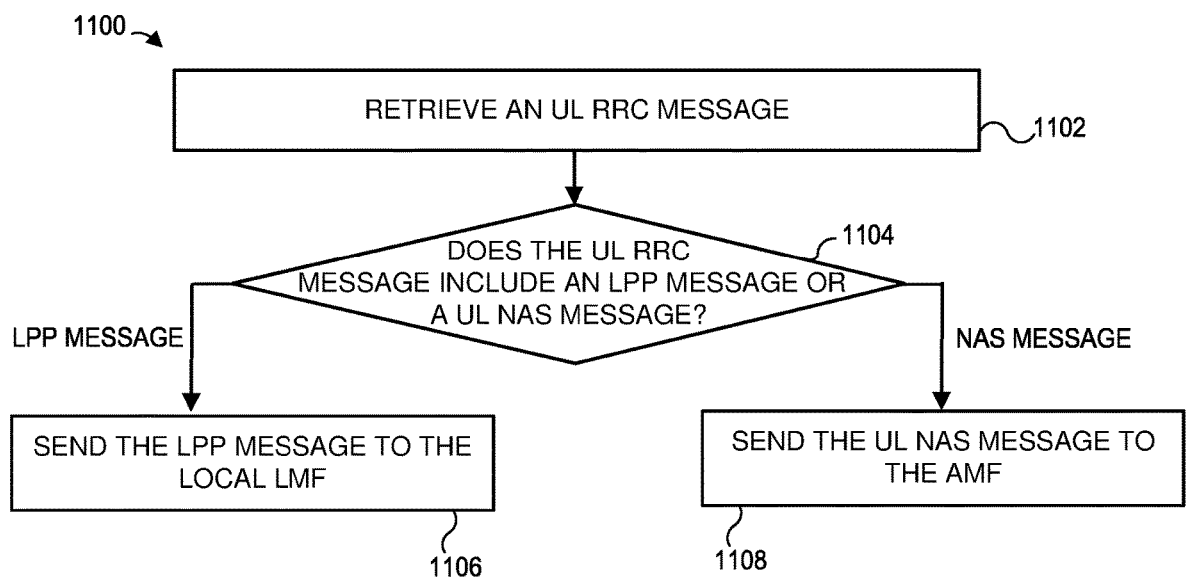
FIG. 11 is a flow diagram of example method for transporting an LPP message layered directly over an RRC message in the uplink direction to a local LMF or an AMF, which can be implemented in the base station of FIG. 1.

Next, FIG. 11 illustrates an example method which the base station 104 can implement to operate according to the protocol architecture of FIGS. 8 and 9 and send a message related to an LCS to a local LCS entity (e.g., the local LMF 120) or a remote LCS entity (e.g., the non-local LMF/E-SMLC 114). Thus, according to the method 1100, the base station 104 transports a positioning protocol message for processing at a RAN-based LCS or CN-based LCS.

The method 1100 begins at block 1102, where the base station 104 receives a UL RRC message from the UE 102 via the radio interface. As illustrated in FIGS. 3 and 4, the UL RRC message can be layered over PDCP, RLC, MAC, and PHY. Next, at block 1104, the base station 104 determines whether the UL RRC message includes an LPP message layered directly over RRC or includes a UL NAS message. For simplicity, the discussion of FIG. 11 refers to the LPP message layered directly over RRC as "LPP message." When the UL RRC message includes an LPP message, the flow proceeds to block 1106. Otherwise, when the UL RRC message does not include an LPP message layered directly over RRC, the flow proceeds to block 1108. At block 1106, the base station 104 sends the LPP message to the local LMF 120. At block 1108, the base station 104 sends the UL NAS message to the AMF 112.

In some scenarios, the UL NAS message may include an LPP message the UE 102 addresses to a non-local LCS entity such as the LMF/E-SMLC 114. For example, the UL NAS message can be a UL NAS TRANSPORT message. The base station 104 does not process the LPP message according to the scenario of FIG. 11 because the AMF 112 extracts the LPP message from the UL NAS message and forwards the LPP message to the non-local LMF/E-SMLC 114. In another scenario, the UL NAS message does not include an LPP message. For example, the UL NAS message may be a 5GMM message or a 5GSM message, other than the UL NAS TRANSPORT. The 5GMM message can be a REGISTRATION REQUEST, REGISTRATION COMPLETE, SERVICE REQUEST, CONFIGURATION UPDATE COMPLETE, IDENTITY RESPONSE, AUTHENTICATION RESPONSE, SECURITY MODE REJECT, DEREGISTRATION REQUEST, NOTIFICATION RESPONSE, SECURITY MODE COMPLETE, 5GMM STATUS or DEREGISTRATION ACCEPT. The 5GSM message can be a PDU SESSION ESTABLISHMENT REQUEST, PDU SESSION AUTHENTICATION COMPLETE, PDU SESSION MODIFICATION REQUEST, PDU SESSION MODIFICATION COMPLETE, PDU SESSION MODIFICATION COMMAND REJECT, PDU SESSION RELEASE REQUEST, PDU SESSION RELEASE COMPLETE or 5GSM STATUS.

In some implementations, the base station 104 determines with which signaling radio bearer (SRB) the UL RRC message is associated (i.e., over which SRB the UL RRC message arrives at the base station 104). In general, UEs and base stations utilize SRBs of several types known as SRB1, SRB2, SRB3, etc. The base station 104 can determine whether the UL RRC message is associated with an SRB1 or SRB2, for example, performs an appropriate RRC procedure if the UL RRC message is associated with the SRB1, and executes the method of FIG. 11 if the UL RRC message is associated with the SRB2. In another implementation, the base station 104 does not consider the SRB over which the UL RRC message arrives. When, upon executing the method 1100, the base station 104 determines that the UL RRC message includes neither an LPP message nor an UL NAS message, the base station 104 performs an appropriate RRC procedure to process the UL RRC message. As a more specific example, the UL RRC message can be a MeasurementReport or a UEAssistanceInformation.

Similar to the examples discussed above, the UL RRC message the base station 104 processes according to the method 1100 can be a ULInformationTransfer message or a dedicated UL RRC message specifically defined to carry an LPP message. Similarly, in the downlink direction, the base station 104 can use a DL RRC message that is a DLInformationTransfer message or a DL RRC message specifically dedicated to carrying an LPP message.

Also similar to the examples above, the RRC controller 168 operating in the base station 104 (see FIG. 1) can rely on the RRC layer to determine how the base station 140 should process the received UL RRC message. The UL RRC message can include an indication of whether the UL RRC message carries an LPP message. For example, the RRC message can be a dedicated message defined specifically and directly to carry an LPP message (i.e., carry an LPP message layered over RRC). The dedicated message can be a specific RRC message type message. The dedicated message may not be used to carry a UL NAS message. The dedicated message (or the RRC message type) in this implementation indicates to the base station 104 that the RRC message includes an LPP message layered over RRC. When the base station 104 determines that the RRC message carries LPP over RRC, the base station 104 transmits the LPP message to the local LMF 120. If the base station determines that the UL RRC message is not the dedicated message and includes an UL NAS message, the base station extracts the UL NAS message from the UL RRC message and sends the UL NAS message to the AMF 112. In one case, the UL NAS message may include an LPP message, as described above. In another case, the UL NAS message may not include an LPP message and includes a 5GMM message or a 5GSM message, as described above.

In another implementation, the UL RRC message includes a certain first field (e.g., a field of a first type) containing an LPP message and/or another, second field (e.g., a field of a second type) containing a UL NAS message. When the base station 104 determines that the UL RRC message includes the field of the first type, the base station 104 extracts the LPP message from the UL RRC message. The base station 104 then sends the LPP message to the local LMF 120. When the base station 104 determines that the UL RRC message includes a field of the second type, the base station 104 extracts the UL NAS message from the UL RRC message and sends the UL NAS message to the AMF 112.

Further, the UL RRC message can include information in the form of an IE, a field identifier, an IE identifier, etc. that indicates whether the UL RRC message includes an LPP message. When the base station 104 determines that the UL RRC message includes this information, the base station 104 extracts the LPP message from the UL RRC message and sends the LPP message to the local LMF 120. When the base station 104 determines that the UL RRC message does not include this information, the base station 104 extracts the UL NAS message from the UL RRC message and sends the UL NAS message to the AMF 112. Finally, when the UL RRC message does not indicate that the UL RRC message includes either the LPP message layered directly over RRC or a UL NAS message, the base station processes the UL RRC message locally.

In some implementations, the RAN 130 and/or the CN 110 provide indications of whether the wireless communication network supports RAN-based LCS, CN-based LCS, or both. The UE 102 can use these indications to select the corresponding procedure, format outbound LPP message, and receive inbound LPP messages.

Figure 12A:
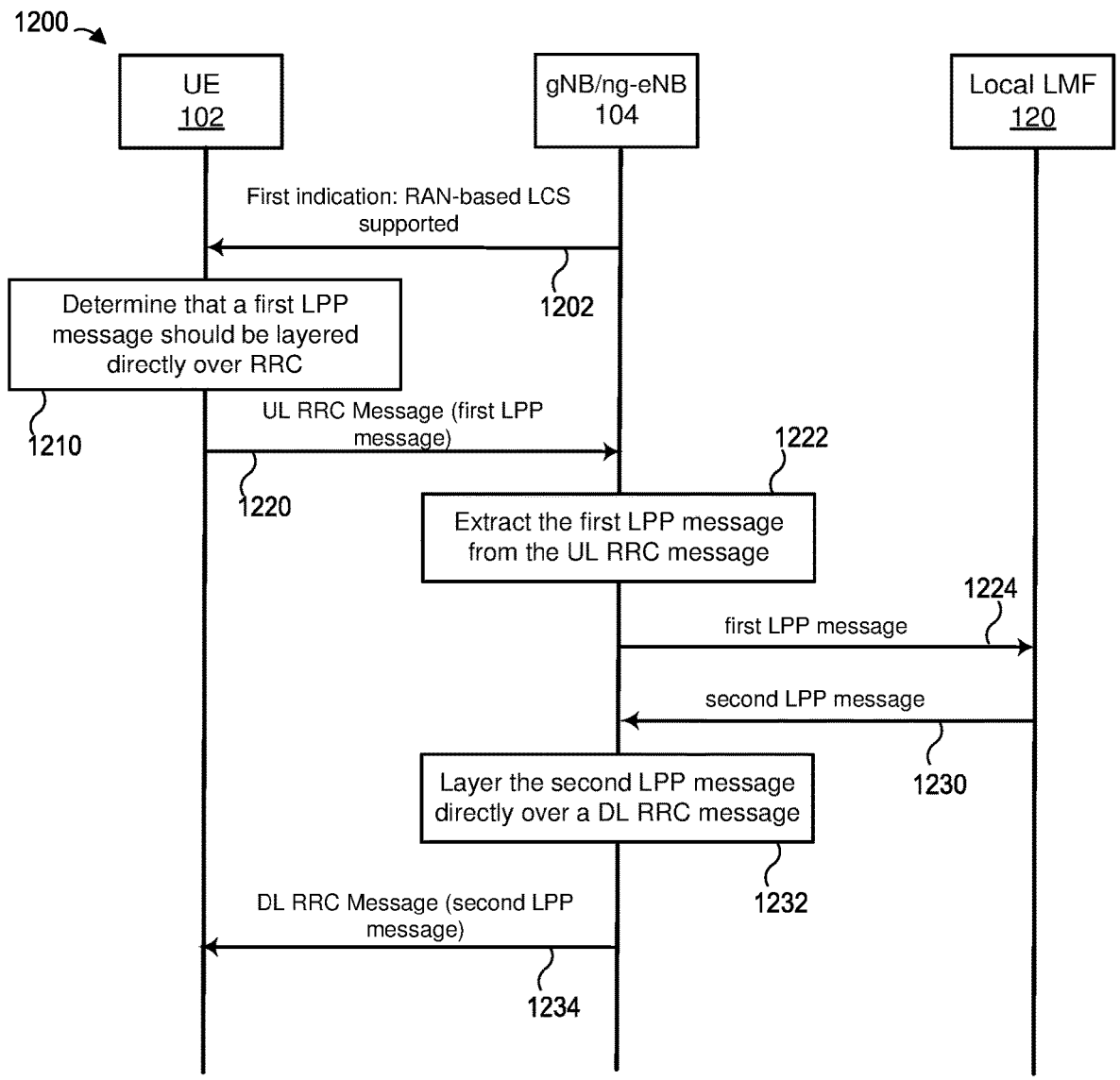
FIG. 12A is a messaging diagram of example scenario in which the UE and the base station of FIG. 1 exchange LPP messages layered over NAS directly over RRC, after the base station notifies the UE 102 that RAN-based LCS is supported.
Figure 12B:
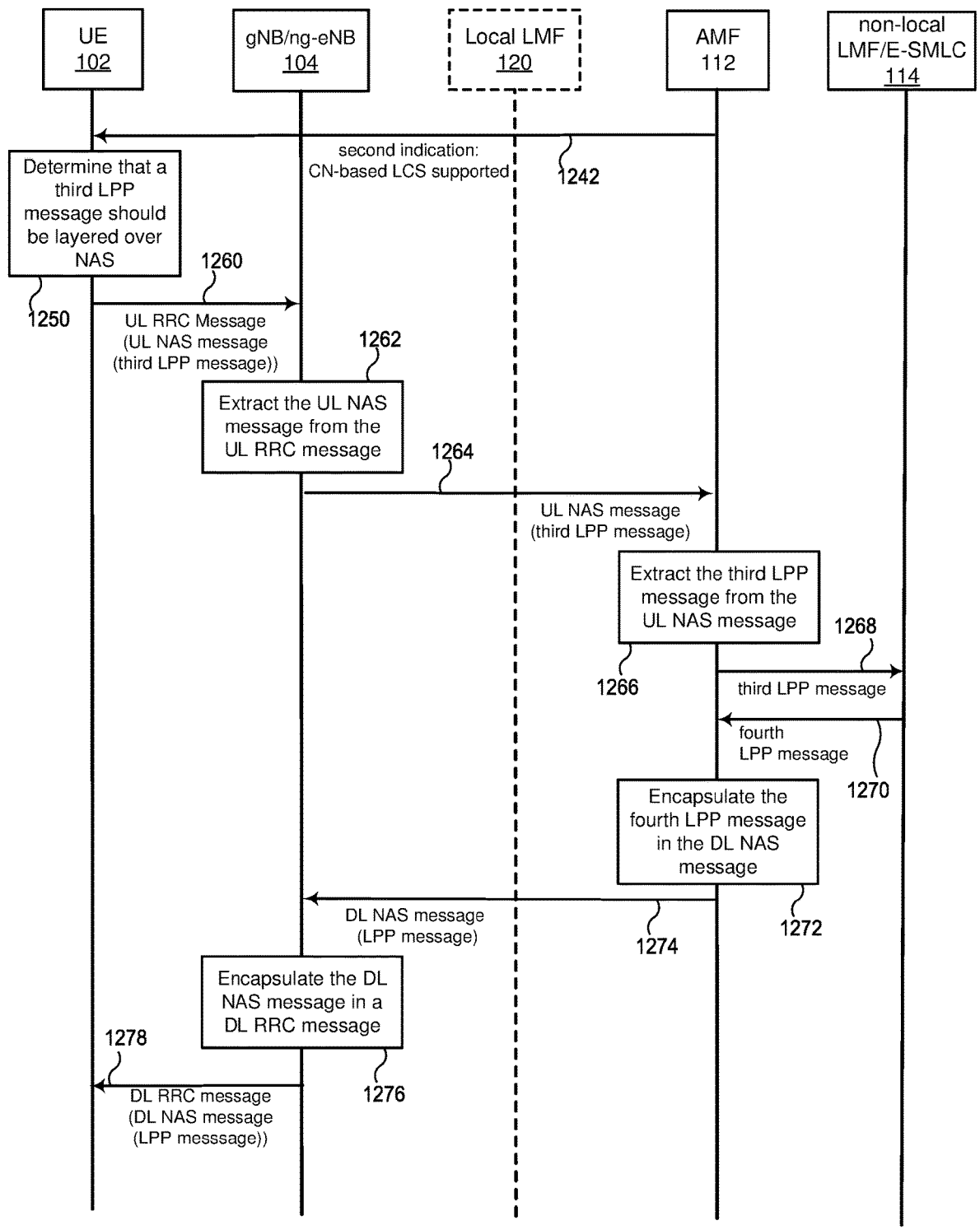
FIG. 12B is a message diagram of an example scenario in which the UE and the base station of FIG. 1 exchange LPP messages layered over NAS, and the CN notifies the UE that CN-based LCS is supported.

FIGS. 12A and 12B illustrate example scenarios in which the UE 102 determines to which LCS entity the UE 102 should send an LPP message, and in what format. These scenarios can occur sequentially or independently. For clarity, the discussion below refers to a sequence of LPP messages 1, 2, 3, and 4, with messages 1 and 3 traveling from the UE 102 to respective LCS entities, and messages 2 and 4 traveling from the LCS entities to the UE 102.

Referring first to FIG. 12A, according to a scenario 200, the base station 104 provides 1202 a first indication that the RAN 130 supports RAN-based LCS. More particularly, the base station 104 can determine that the base station 104 is connected to a local LMF, or that the base station 104 incorporates a co-located instance local LMF. The base station 104 can provide the first indication using a broadcast message, such as system information block (SIB), in the cell 140 (see FIG. 1). In another implementation, the base station 104 can send to the UE 102 a dedicated RRC message such as RRC Setup, RRC Reconfiguration, RRC Resume, or RRC Reestablishment. In yet another implementation, the UE 102 receives a broadcast or UE-specific indication from another base station such as the base station 106.

After the UE 102 receives the first indication, the UE 102 determines 1210 to perform a procedure that uses RAN-based LCS. In view of the first indication, the UE 102 generates a UL RRC message that includes the first LPP message layered directly over RRC, free of an intermediate layer such as NAS, and transmits 1220 the UL RRC message to the base station 104. The first LPP message can be for example LPP Request Assistance Data. The base station 104 extracts 1222 the first LPP message from the UL RRC message and sends 1224 the first LPP message to the local LMF 120. The local LMF 120 then sends 1230 a second LPP message to the base station 104. The second LPP message can be for example LPP Provide Assistance Data. The base station 104 then layers 1232 the second LPP message directly over a DL RRC message and sends 1234 the DL RRC message to the UE 102 via the radio interface.

When the UE 102 does not receive the first indication (event 1202), or when the UE 102 receives a second indication that the CN 110 supports CN-based LCS, the UE 102 can perform a procedure that uses CN-based LCS. In some implementations, when the UE 102 receives both indications (i.e., that RAN-based LCS as well as CN-based LCS are available), the UE 102 selects between the RAN-based LCS and the CN-based LCS based on the relative priorities of these services, as discussed above. In yet other implementations, the UE 102 assumes that CN-based LCS is available and does not expect the corresponding indication.

In the implementation illustrated in FIG. 12B, the AMF 112 or another entity operating in the CN 110 provides 1242 an indication that CN-based LCS is supported (a second indication), and the UE 102 determines 1250 to perform a procedure that uses CN-based LCS. The AMF 112 can send the second indication in a DL NAS message such as Registration Accept in response to a Registration Request received from the UE, via the base station 104 or the base station 106.

In view of the second indication, the UE 102 generates a UL NAS message that includes the third LPP message layered over NAS, includes the UL NAS in an UL RRC message, and transmits 1260 the UL RRC message including the UL NAS message to the base station 104. The third LPP message can be for example LPP Request Assistance Data. The base station 104 extracts 1262 extracts the UL NAS message from the RRC message and sends 1264 the UL NAS message including the third LPP message to the AMF 112. The AMF 112 extracts 1266 the LPP message from the UL NAS message and sends 1268 the third LPP to the non-local LMF/E-SMLC 114.

In response, the non-local LMF/E-SMLC 114 sends 1270 a fourth LPP message to the AMF 112. The AMF 112 includes (encapsulates) 1272 the fourth LPP in a DL NAS message. The AMF sends 1274 the DL NAS message to the base station 104, which then includes 1276 the DL NAS message in a DL RRC message and sends 1278 the DL RRC message to the UE 102 via the radio interface.

When the UE 102 receives both the first and second indications, the UE 102 can choose to perform a RAN-based LCS or a CN-based LCS according to the configuration of the UE 102. One example configuration of the UE 102 assigns a higher priority to RAN-based LCS than to CN-based LCS. As another example, the configuration of the UE can specify that the UE 102 should use RAN-based LCS when the UE 102 is performing a procedure related to a certain (first) LCS service, and use CN-based LCS when the UE 102 is performing a procedure related to another (second) service. In some implementations, the manufacturer of the UE 102 specifies these parameters, and UE 102 retrieves these parameters from a permanent memory. In another implementation, a USIM stores the configuration. In yet another implementation, the UE 102 receives the configuration from the CN 110 or a server in the operator's network.

Figure 13:
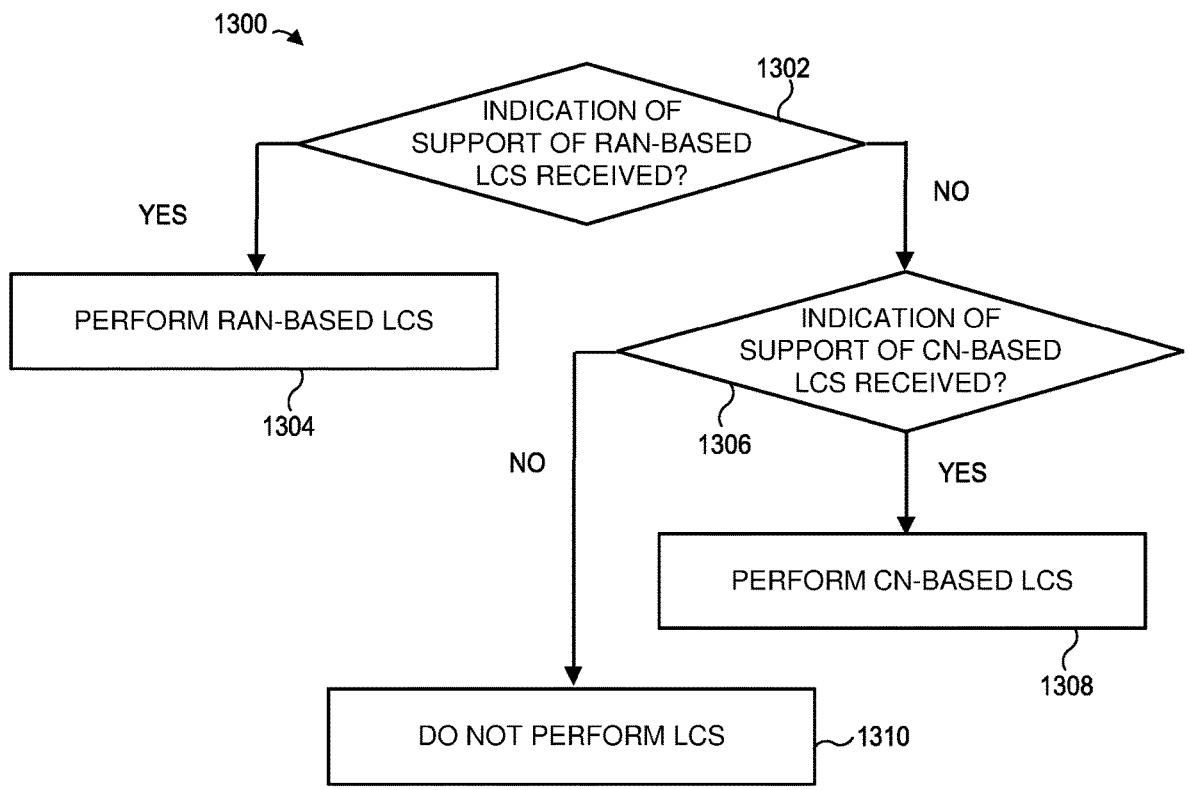
FIG. 13 is a flow diagram of an example method for determining whether to perform RAN-based LCS or CN-based LCS, which can be implemented in the UE of FIG. 1.

FIG. 13 is a flow diagram of an example method 1300 for determining whether to perform RAN-based LCS or CN-based LCS, which can be implemented in the UE 102. According to this example method, the RAN-based LCS has priority over CN-based LCS. Thus, when both options are available, the UE 102 chooses RAN-based LCS. In other implementations or scenarios, however, CN-based LCS can have priority over RAN-based LCS, or CN-based LCS and RAN-based LCS can have the same priority (and the UE 102 can choose between these services based on the timing of the corresponding indications, for example).

The method 1300 begins at block 1302, where the UE 102 determines whether it has received an indication that the RAN 130 supports RAN-based LCS. If the UE 102 has received such an indication, the flow proceeds to block 1304, and the UE 102 performs a procedure that uses RAN-based LCS. Otherwise, if the UE 102 has not received this indication, the flow proceeds to block 1306.

At block 1306, the UE 102 determines whether it has received an indication that the CN 110 supports CN-based LCS. If the UE 102 has received such an indication, the flow proceeds to block 1308, and the UE 102 performs a procedure that uses CN-based LCS. Otherwise, if the UE 102 has not received this indication, the flow proceeds to block 1310, where the UE 102 chooses to not perform LCS procedures.

Figure 14:
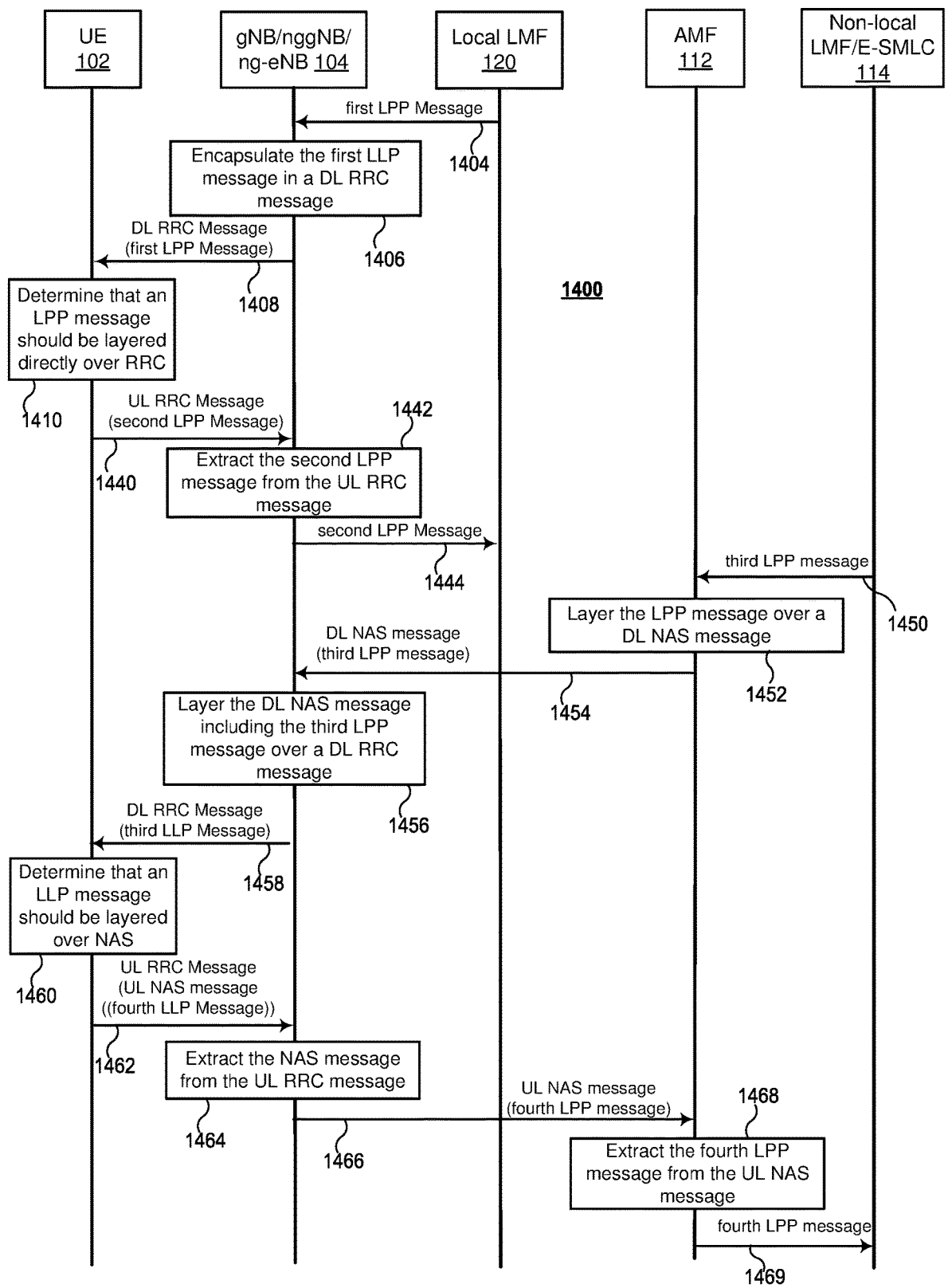
FIG. 14 is a messaging diagram of an example scenario in which the UE and the base station of FIG. 1 exchange LPP messages layered over RRC or NAS.

Next, FIG. 14 illustrates an example scenario 1400 in which the UE 102 determines how it should layer LPP messages based on the encapsulation technique in the downlink direction.

In particular, the base station 104 receives 1404 a first LPP message from the local LMF 120 and encapsulates 1406 the first LPP message in DL RRC message without an intermediate layer, i.e., layers the first LPP message directly over RRC. The first message can be for example LPP Request Capabilities. The UE 102 receives 1408 the DL RRC message the from the base station 104. Because the first LPP message is layered directly over RRC, the UE 102 determines that the UE 102 should layer a second LPP, which may be responsive to the first LPP (e.g., LPP Provide Capabilities), directly over RRC. The UE 102 also can determine, based on the direct layering of the first LPP message over RRC, that the first LPP message arrived from a RAN-based LCS entity rather a CN-based LCS entity.

The UE 102 generates 1410 a second LPP message and layers the second LPP message directly over RRC, in a UL RRC message. The UE 102 then sends 1440 the UL RRC message to the base station 104. The base station 104 extracts 1442 the second LPP message and sends 1444 the second LPP message to the local LMF 120.

At a later time, the non-local LMF/E-SMLC 114 sends 1450 a third LPP message to the AMF 112, which layers 1452 the third LPP message over NAS to generate a DL NAS message. The third LPP message can be for example LPP Request Capabilities. The AMF 112 then sends 1454 the DL NAS message including the third LPP message to the base station 104, which layers 1456 the DL NAS message over RRC to generate a DL RRC message. The base station 104 then sends 1458 the DL RRC message to the UE 102 via the radio interface.

After the UE 102 receives 1458 the DL RRC message, the UE 102 determines 1460, based on the encapsulation of the third LPP message, that it should respond with a fourth LPP message layered over NAS rather than directly over RRC. The fourth LPP message can be for example LPP Provide Capabilities. The UE 102 sends 1462 the fourth LPP message layered over NAS to the base station 104, in an UL RRC message. The base station 104 extracts 1464 the NAS message from the UL RRC message and sends 1466 the UL NAS message to the AMF 112. The AMF 112 in turn extracts 1466 the fourth LPP message from the UL NAS message and sends 1469 the fourth LPP message to the non-local LMF/E-SMLC 114.

Thus, in the scenario of FIG. 14, the UE 102 responds to an LPP message from an LCS entity with an LPP message layered directly over RRC if the LPP message from the LCS entity is layered directly over RRC, and responds to the LPP message from the LCS entity with an LPP message layered directly over NAS if the LPP message from the LCS entity is layered directly over NAS.

For further clarity, several example positioning techniques are discussed next.

Figure 15:
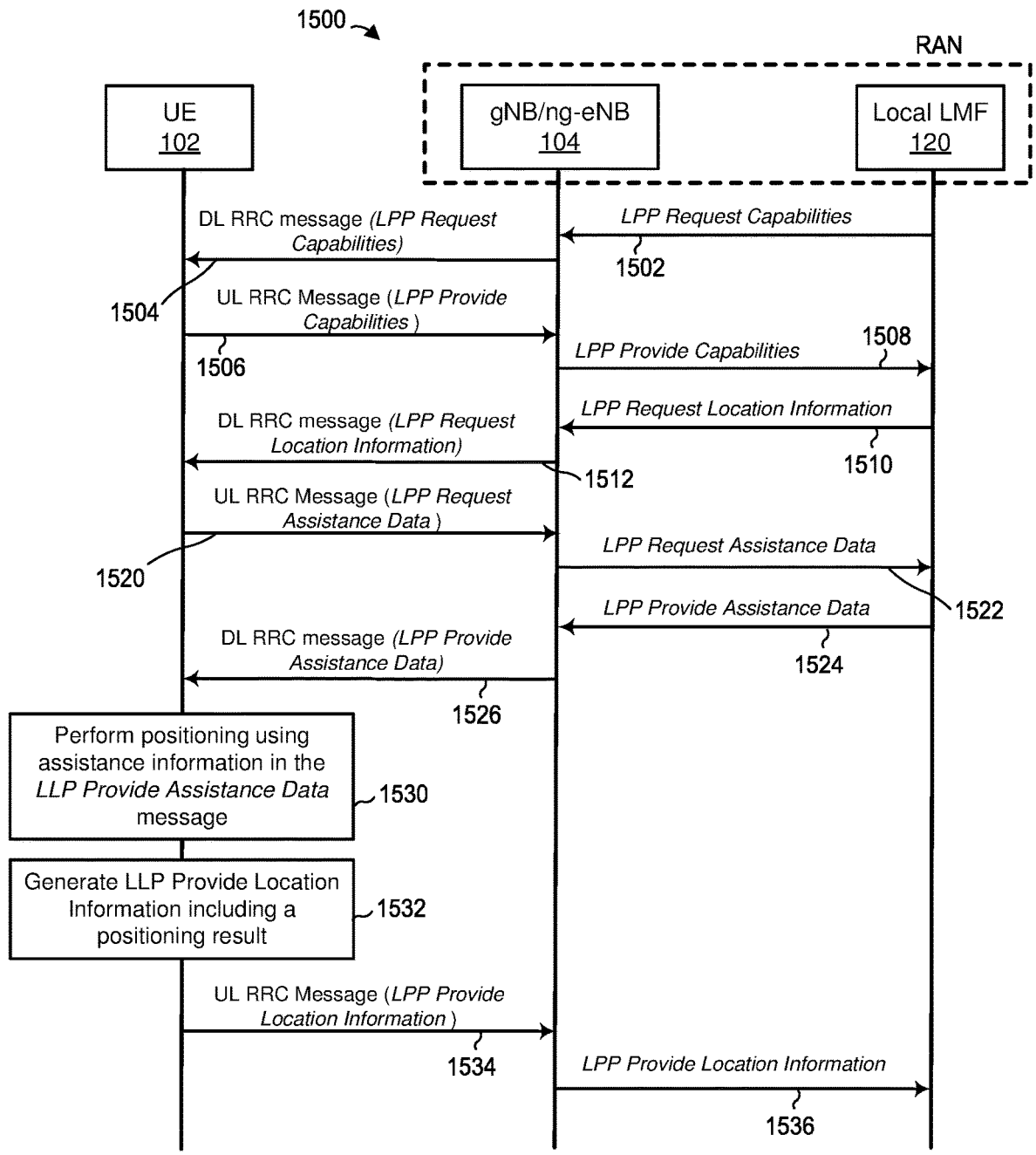
FIG. 15 is a messaging diagram of an example scenario in which the UE performs a positioning procedure with the assistance of local LMF.

First, FIG. 15 illustrates a positioning procedure 1500 that involved a UE 102 and the RAN 130, in which the base station 104 and the local LMF 120 operate. In some implementations, the RAN 130 includes another base station (e.g., the base station 106). In the example of FIG. 15, the UE 102 thus can communicate with the local LMF 120 via any suitable one or several base stations. Further, although the discussion of FIG. 15 refers to the local LMF 120, in other implementations other components such as a location management component (LMC) can provide RAN-based LCS. An LCS service of the scenario 1500 is a RAN-based LCS and as such does not require that the UE 102 exchange LPP messages with the core network.

The local LMF 120 in this scenario initially is not aware of LPP/LCS capabilities of the UE 102. To determine these capabilities, the local LMF 120 sends 1502 an LPP Request Capabilities message to the UE via the base station 104, and the base station 104 transmits 1504 this request in a DL RRC message. The UE 102 in response transmits 1506 an LPP Provide Capabilities response to the base station 104, which then sends 1508 this response to the local LMF 120.

The local LMF 120 sends 1510 an LPP Request Location Information message to the UE 102 via the base station 104 (event 1512) to request the positioning result from the UE 102. When the UE 102 requires assistance information for positioning, the UE 102 sends 1520 an LPP Request Location Information message to the local LMF 120 via the base station 104 (event 1522). In response, the local LMF 120 sends 1524 to the UE 102 (again via the base station 104; event 1526) an LPP Provide Assistance Data message including assistance information. The UE 102 performs 1530 positioning using the assistance information (if this information has been provided), stored assistance information, or without using any assistance information (i.e., the UE 102 in some cases can perform positioning without any assistance information from the local LMF 120). The UE 102 generates 1532 a positioning result and sends 1534 to the local LMF 120, via the base station 104 (event 1536), an LPP Provide Location Information message including the positioning result (e.g., location measurement data and/or a location estimate).

In various scenarios, the UE 102, the RAN 130 including the local LMF 120 (or an LMC) and one or more base stations (e.g., the base stations 104, 106), and the CN 110 may exchange the LPP messages for a mobile originated location request (MO-LR), a mobile terminated location request (MT-LR), a network-initiated location request (NI-LR), or an event triggered-location reporting as discussed below. In FIGS. 16-19, the RAN 130 for convenience is illustrated as being separated from the local LMF 120; however, as discussed above, the local LMF 120 can be connected directly to the base station 104 and provides RAN-based LCS.

Figure 16:
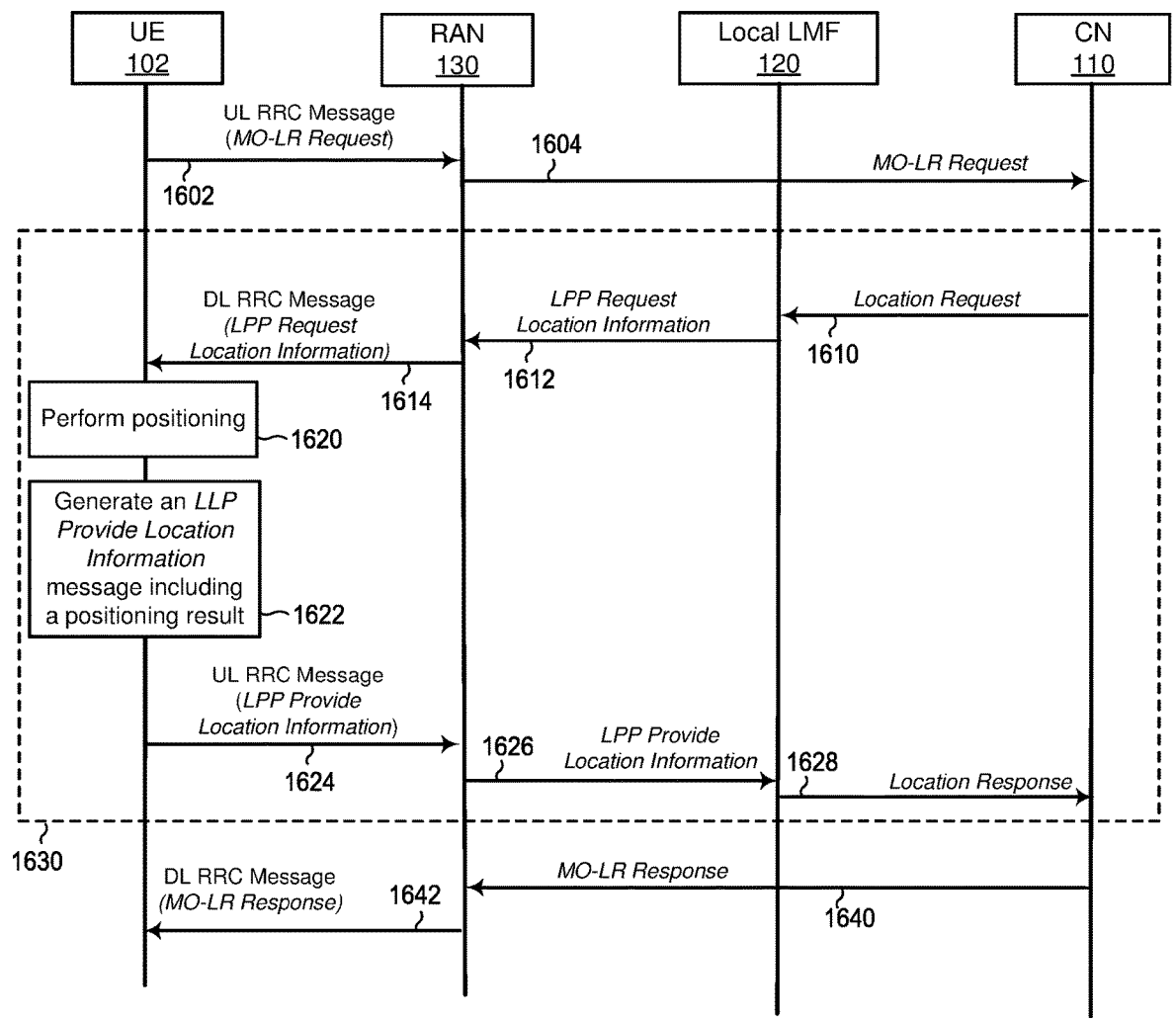
FIG. 16 is a messaging diagram of an example scenario in which the UE performs a positioning procedure related to a mobile-originated location request (MO-LR)

As illustrated in FIG. 16, the UE 102 sends 1602 a MO-LR Request message to the CN 110 via the RAN 130 (event 1604) to perform an MO-LR procedure. The CN 110 sends 1610 a Location Request message to the local LMF 120 in response to the MO-LR Request message. In response, the local LMF 120 then sends 1612 an LPP Request Location Information message to the UE 102 via the RAN 130. In some cases, the local LMF 120 may send an LPP Request Capabilities message in response to the Location Request message and receive an LPP Provide Capabilities message in response, prior to sending 1614 the LPP Request Location Information message as discussed above. The UE 102 performs 1620 positioning to obtain a positioning result (e.g., location measurement data and/or a location estimate) and generates 1622 an LPP Provide Location Information message including the positioning result, in response to the LPP Request Location Information message. The UE 102 sends 1624 an LPP Provide Location Information message to the local LMF 120 via the RAN 130 (event 1626), in response to the LPP Request Location Information message. In some cases, the UE 102 may send an LPP Request Assistance Data message to the local LMF 120 and receive an LPP Provide Assistance Data message before performing 1620 positioning as described above.

In response to the LPP Provide Location Information message, the local LMF 120 generates a Location Response message. In some implementations, the local LMF 120 includes the positioning result in the Location Response message. In other implementations, the local LMF 120 generates (i.e. derives or computes) location information based on the positioning result. The local LMF 120 includes the location information in the Location Response message and sends 1628 the Location Response message to the CN 110. The procedure that begins with the CN 110 sending 1610 a Location Request to the local LMF 120 and ends with the CN 110 receiving 1628 the Location Response can be referred to as a location retrieval procedure 1630.

The CN 110 generates a MO-LR Response message in response to the Location Response message and sends 1640 the MO-LLR Response message to the UE 102 via the RAN 130 (event 1642). The CN 110 may include the positioning result or the location information in the MO-LR Response message.

In accordance with the techniques discussed above, the UE 102 may encapsulate the MO-LR Request message in a UL NAS message and encapsulate the UL NAS message in an UL RRC message. The UE 102 then can transmit the UL RRC message to the RAN. The RAN 130 extracts the UL NAS message from the UL RRC message and sends the UL NAS message to the CN 110. The CN 110 can encapsulate the MO-LR Response message in an DL NAS message and transmits the DL RRC message to the RAN. The RAN 130 can encapsulate the DL NAS message in an DL RRC message and transmit the DL RRC message to the UE 102. Then the UE 102 can extract the DL NAS message from the DL RRC message and extracts the MO-LR Response message from the DL NAS message.

Figure 17:
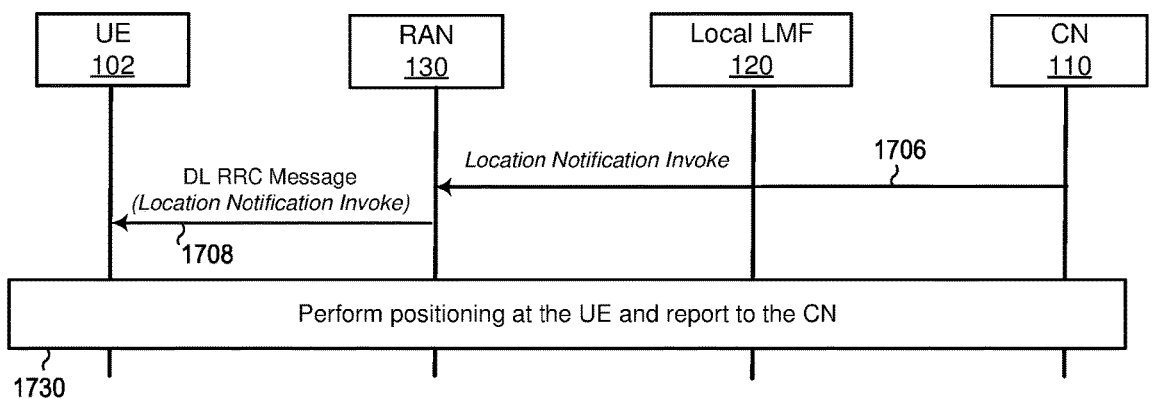
FIG. 17 is a messaging diagram of an example scenario in which the UE performs a positioning procedure related to a mobile-terminated location request (MT-LR)

In the scenario of FIG. 17, the CN 110 sends 1706 a Location Invoke message for a MT-LR procedure to the UE 102 via the RAN 130 (event 1708). The UE 102, the RAN 130, the local LMF 120, and the CN 110 then perform a location retrieval procedure 1730 similar to the location retrieval procedure 1630 discussed above with reference to FIG. 16. Also similar to the scenario of FIG. 16, the UE 102, the RAN 130, the local LMF 120, and the CN 110 can use the LPP encapsulation and transport techniques of this disclosure.

Figure 18:
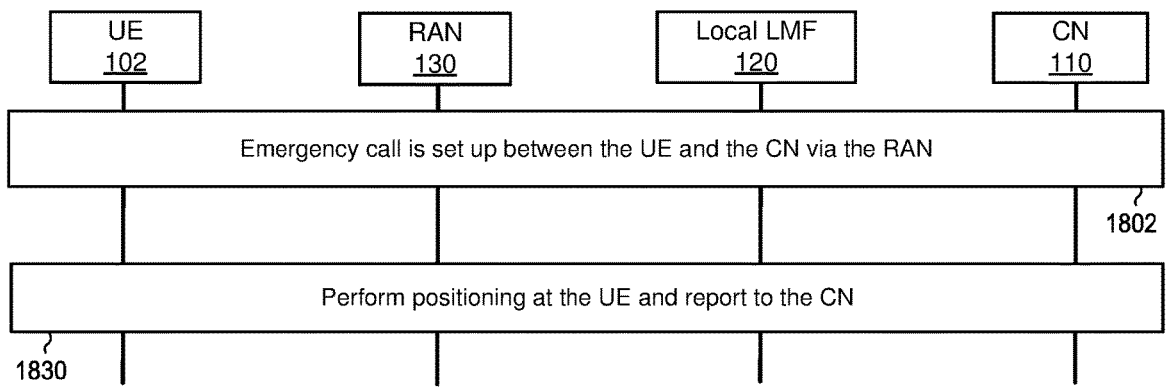
FIG. 18 is a messaging diagram of an example scenario in which the UE performs a positioning procedure related to a network-initiated location request (NI-LR)

In the scenario of FIG. 18, the UE 102 sets up 1802 an emergency call with the CN 110 via the RAN 130. The UE 102, the RAN 130, the local LMF 120, and the CN 110 then perform a location retrieval procedure 1830 similar to the location retrieval procedure 1630 discussed above with reference to FIG. 16. Also similar to the scenario of FIG. 16, the UE 102, the RAN 130, the local LMF 120, and the CN 110 can use the LPP encapsulation and transport techniques of this disclosure.

Figure 19:
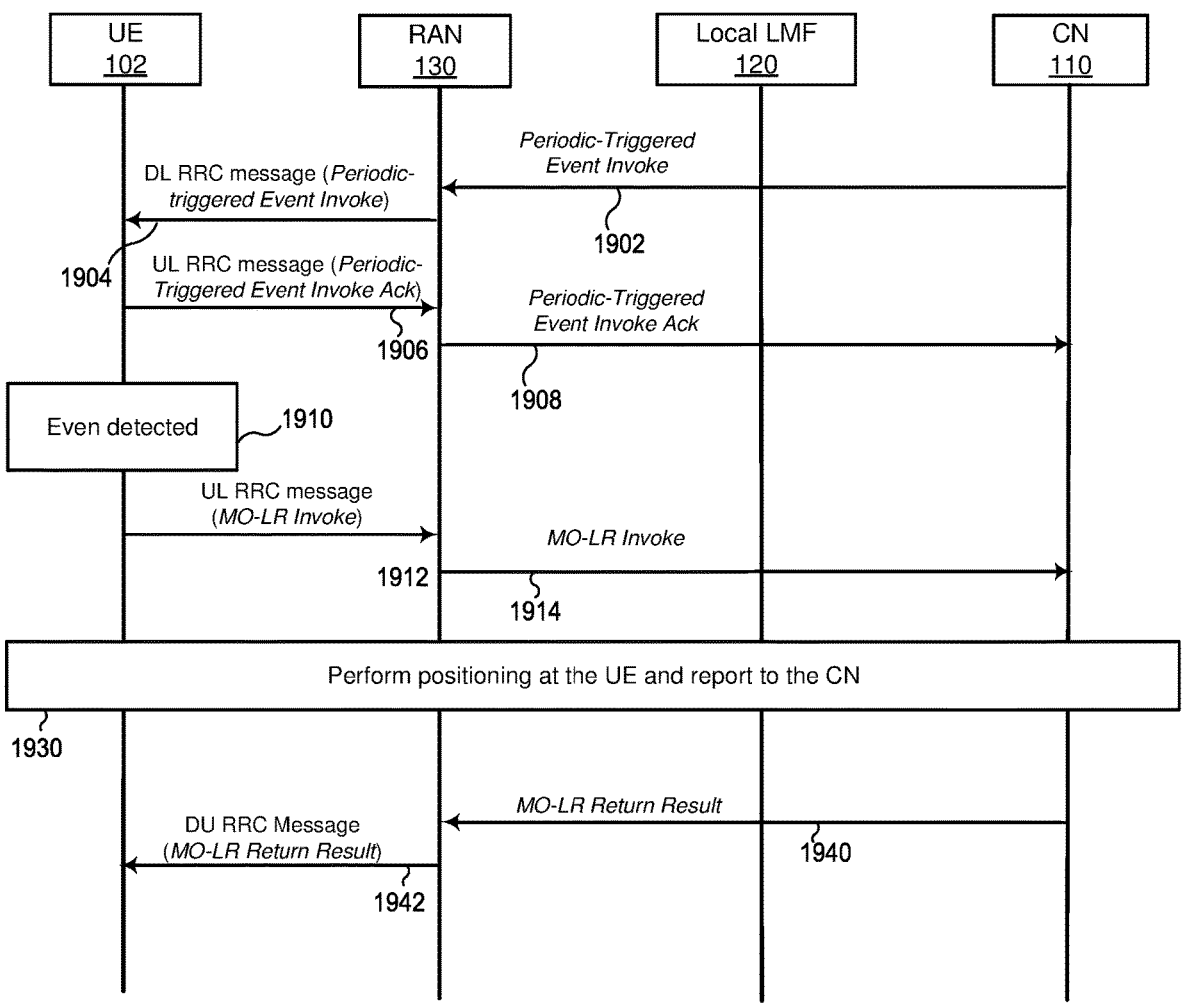
FIG. 19 is a messaging diagram of an example scenario in which the UE performs an event-triggered location reporting procedure.

FIG. 19 illustrates an example scenario in which the CN 110 sends 1902 a Periodic-Triggered Event Invoke 1902 message to the UE 102 via the RAN 130 (event 1904). The UE 102 sends 1906 a Periodic-Triggered Event Invoke Ack to the CN 110 via the RAN 130 (event 1908). When the UE 102 detects 1910 a suitable event, the UE 102 sends 1912 an LCS MO-LR Invoke message to the CN 110 via the RAN 130 (event 1914). The UE 102, the RAN 130, the local LMF 120, and the CN 110 then perform a location retrieval procedure 1930 similar to the location retrieval procedure 1630 discussed above with reference to FIG. 16. Also similar to the scenario of FIG. 16, the UE 102, the RAN 130, the local LMF 120, and the CN 110 can use the LPP encapsulation and transport techniques of this disclosure. The CN 110 then generates a MO-LR Return Result message and sends 1940 the MO-LR Return Result message to the UE 102 via the RAN 130 (event 1942). The CN 110 may include the positioning result or the location information in the MO-LR Return Result message.

According to the techniques of this disclosure, the UE 102 can encapsulate the MO-LR Invoke message in a UL NAS message and encapsulate the UL NAS message in an UL RRC message. Then UE 102 transmits the UL RRC message to the RAN 130. The RAN 130 extracts the UL NAS message from the UL RRC message and sends the UL NAS message to the CN 110. The CN 110 can encapsulate the MO-LR Return Result message in an DL NAS message and transmit the DL RRC message to the RAN 130. The RAN 130 can encapsulate the DL NAS message in an DL RRC message and transmit the DL RRC message to the UE 102. Then, the UE 102 can extract the DL NAS message from the DL RRC message and extract the MO-LR Return Result message from the DL NAS message.

Figure 20:
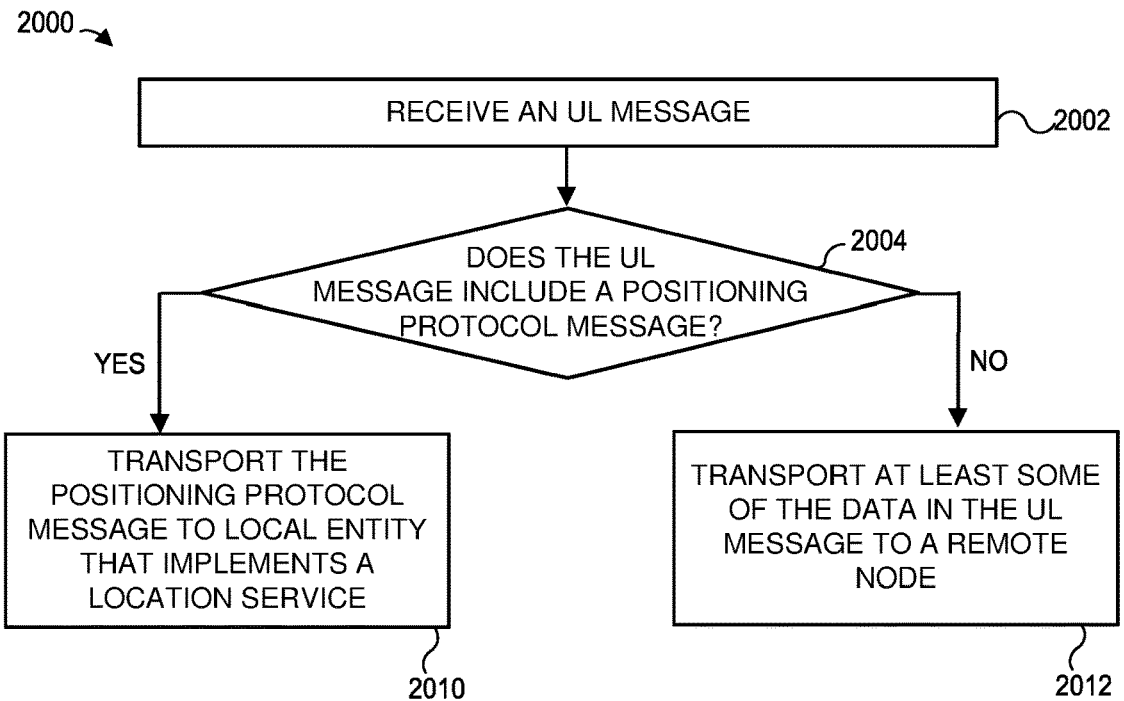
FIG. 20 is a flow diagram of an example method for transporting an uplink positioning message to a local LCS entity, which can be implemented in the base station of FIG. 1.
Figure 21:
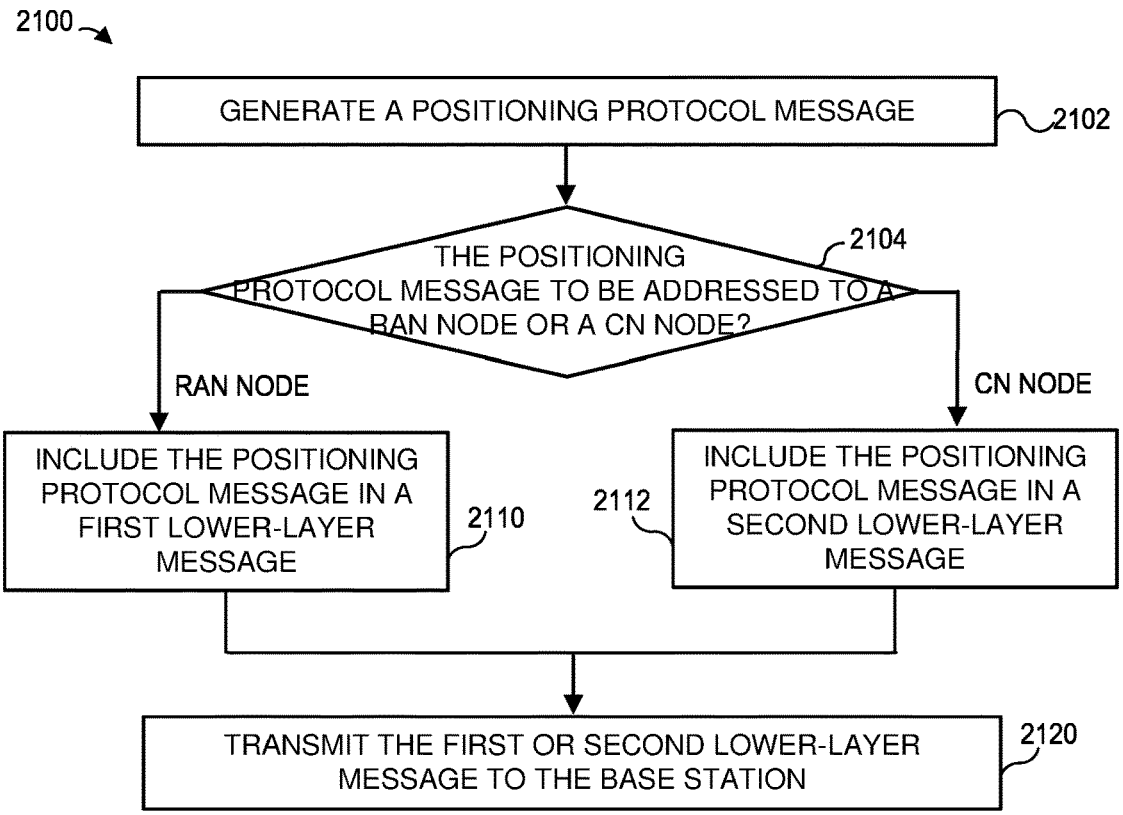
FIG. 21 is a flow diagram of an example method for sending a positioning protocol message to a local or more LCS entity via a base station, which can be implemented in the UE of FIG. 1.
Figure 22:
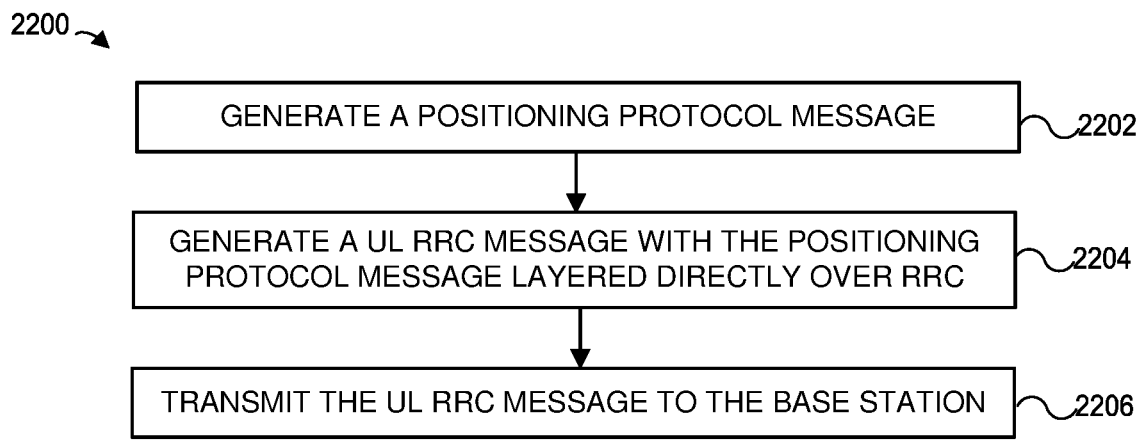
FIG. 22 is a flow diagram of another example method for sending a positioning protocol message to a local or more LCS entity via a base station, which can be implemented in the UE of FIG. 1.

Next, several example methods that the base station 104 and the UE 102 can implement are considered with reference to FIGS. 20-22.

First, FIG. 20 illustrates an example method 2000 for transporting an uplink positioning message to a local LCS entity, which can be implemented in the base station 104 or another suitable base station. The method begins at block 2002, where the base station 104 receives a UL message (e.g., event 504 of FIG. 5, event 1102 of FIG. 11).

At block 2004, the base station 104 determines whether the UL message includes a positioning protocol message (event 506 of FIG. 5). If the base station 104 determines that the UL message includes a positioning protocol message, the flow proceeds to block 2010, where the base station 104 transports the positioning protocol message to a local entity that implements the location service (e.g., the local LMF 120) (event 512 of FIG. 5, event 1106 of FIG. 11). Otherwise, when the base station 104 determines that the UL message does not include a positioning protocol message, the flow proceeds to block 2012, where the base station 104 transports at least some of the data in the UL message to a remote node (e.g., the AMF 112) (event 508 of FIG. 5, 1108 of FIG. 5).

FIG. 21 illustrates an example method 2100 for sending a positioning protocol message to a local or more LCS entity via a base station, which can be implemented in the UE 102 or another suitable UE. At block 2102, the UE 102 generates a positioning protocol message (e.g., an LPP message, an NRPP message) (e.g., event 602 of FIG. 6A, event 702 of FIG. 7A). The UE 102 then determines 2104 whether the UE 102 should address the positioning protocol message to a RAN node (e.g., the LMF 120) or a CN node (e.g., the AMF 112) (e.g., event 610 of FIG. 6A, event 710 of FIG. 7A). When the UE 102 determines that it should address the positioning protocol message to a local node, the UE 102 at block 2110 includes the positioning protocol message in a first lower-layer message (e.g., a UL NAS message of a first type, an RRC message of a first type in which the positioning message is layered over NAS, an RRC message in which the positioning protocol message is layered directly over RRC, etc.) (event 612 of FIG. 6A, event 712 of FIG. 7A).

Otherwise, when the UE 102 determines that it should address the positioning protocol message to a CN node, the flow proceeds to block 2112, where the UE 102 includes the positioning protocol message in a second lower-layer message (e.g., a UL NAS message of a second type, an RRC message of a second type in which the positioning message is layered over NAS, etc.) (e.g., event 622 of FIG. 6A, event 722 of FIG. 7A). Next, at block 2120, the UE 102 transmits the first or second lower-layer message to the base station 104 (event 614 or 624 of FIG. 6A, event 714 or 724 of FIG. 7A).

FIG. 22 is a flow diagram of another example method for sending a positioning protocol message to a local or more LCS entity via a base station, which can be implemented in the UE 102 or another suitable UE.

At block 2202, the UE 102 generates a positioning protocol message, such as an LPP message or an NRPP message (event 602 of FIG. 6A, event 702 of FIG. 7A). Next, at block 2204, the UE 102 generates a UL RRC message with the positioning protocol message layered directly over RRC (event 612 of FIG. 6A, event 712 of FIG. 7A). At block 2206, the UE 102 transmits the UL RRC message to the base station 104 (event 614 of FIG. 6A, event 714 of FIG. 7A).

Referring generally to the examples above, the UL RRC message the UE 102 uses to transport LPP messages to a local LCS entity or a remote LCS entity can be a ULInformationTransfer message or a UL RRC message specifically defined to encapsulate LPP messages. Further, the UL NAS message the UE 102 uses to transport LPP messages can be a UL NAS TRANSPORT message or a UL NAS message specifically defined to encapsulate LPP information. The DL RRC message the base station 104 uses can be DLInformationTransfer message or a DL RRC message specifically defined to encapsulate LPP information. Further, the DL NAS message the base station 104 uses can be a DL NAS TRANSPORT message or a DL NAS message specifically defined to encapsulate LPP information.

In some cases, the UE 102 can use one type of UL RRC message to transport an LPP message directly layered over RRC, and another type of UL RRC message to transport an NAS message. In other cases, the UE 102 uses the same type of UL RRC message in both cases. Similarly, the base station 104 can use the same or different types of DL RRC message to transport LPP messages layered directly over RRC or transport NAS messages.

Further referring to the examples above, in some implementations the UE 102 and the base station 104 can layer LPP messages and/or NAS messages directly over the PDCP layer 208 (see FIGS. 2-4), without using the RRC layer 210. Thus, in some implementations, the UE 102 and the base station 104 can layer LPP messages directly over PDCP, without using the RRC layer or the NAS layer, or layer NAS layers over PDCP, without using the RRC layer.

Still further, the UE 102 and the base station 104 can implement a protocol specifically defined to transport LPP, NRPP, or other positioning protocol messages. The UE 102 and the base station 104 can layer the messages of this protocol over RRC or PDCP, for example. In some cases, the UE 102 and the base station 104 can use this protocol to transport messages related to RAN-based LCS, and use NAS to transport positioning protocol messages related to CN-based LCS.

The following additional considerations apply to the foregoing discussion.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can comprise dedicated circuitry or logic that is permanently configured (e.g., as a special-purpose processor, such as a field programmable gate array (FPGA) or an application-specific integrated circuit (ASIC), a digital signal processor (DSP), etc.) to perform certain operations. A hardware module may also comprise programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for resuming RRC connections through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method for supporting location services, the method comprising, at a base station operating in a radio access network (RAN):
   receiving, by the base station, an uplink (UL) message from a user equipment (UE);
   determining, by the base station, whether the UL message includes a positioning protocol message associated with a positioning protocol for exchanging information related to a location service;
   in a first instance, in response to determining that the UL message includes the positioning protocol message, sending the positioning protocol message to a local entity that implements a location service in the RAN; and
   in a second instance, in response to determining that the message does not include any positioning protocol messages, sending at least some of the data included in the UL message to a remote node.

2. The method of claim 1, wherein the UL message corresponds to a non-access stratum (NAS) layer.

3. The method of claim 2, wherein the positioning protocol message is an uplink positioning protocol message, the method further comprising:
   receiving, by the base station, a downlink (DL) positioning protocol message from the local entity;
   including, by the base station, the DL positioning protocol message in a DL NAS message; and
   sending, by the base station, the DL NAS message to the UE.

4. The method of claim 1, wherein:
   the uplink message is associated with a protocol for controlling radio resources, and
   the positioning protocol message in the uplink message is layered directly over the protocol for controlling radio resources, free of an intermediate protocol layer.

5. The method of claim 4, further comprising:
   receiving, from the local entity, a DL positioning protocol message;
   sending, by the base station, the downlink positioning protocol message in a DL message, including layering the DL positioning protocol message directly over a layer of the protocol for controlling radio resources, free of an intermediate protocol layer.

6. The method of claim 1, wherein:
   the uplink message is a first uplink message associated with a protocol for controlling radio resources, and the positioning protocol message is a first positioning protocol message layered directly over the protocol for controlling radio resources, free of an intermediate protocol layer;
   the method further comprising:
      receiving, by the base station, a second uplink message associated with the protocol for controlling radio resources, the second uplink message including a second positioning protocol message layered over NAS.

7. The method of claim 6, further comprising:
   sending the second positioning protocol message to the remote node.

8. The method of claim 1, further comprising:
   receiving, by the base station, a first DL positioning protocol message from the local entity; and
   including, by the base station, the first DL positioning protocol message in a DL radio resource control (RRC) message.

9. The method of claim 8, further comprising:
   receiving, by the base station a second DL positioning protocol message from the remote node; and
   including, by the base station, the second DL positioning protocol message in a DL NAS message.

10. The method of claim 1, further comprising, prior to receiving the UL Message including the positioning protocol message:
    sending to the UE an indication that the location service is available at the local entity.

11. The method of claim 10, wherein sending the indication includes broadcasting the indication in a cell covered by the base station.

12. The method of claim 1, wherein determining whether the UL message includes the positioning protocol message is based on a type of the UL message.

13. The method of claim 1, wherein determining whether the UL message includes the positioning protocol message is based on a type of a lower-layer message that includes the UL message.

14. The method of claim 1, wherein determining whether the UL message includes the positioning protocol message comprises determining whether the UL message includes an information element (IE) indicative of a presence of the positioning protocol message.

15. The method of claim 1, wherein determining whether the UL message includes the positioning protocol message comprises determining whether a lower-layer message that includes the UL message includes an information element (IE) indicative of a presence of the positioning protocol message.

16. The method of claim 1, further comprising:
determining whether the positioning protocol message corresponds to a first message type or a second message type; and
in a third instance, in response to determining that the UL message includes the positioning protocol message of the second message type, sending the positioning protocol message to the remote node;
wherein the positioning protocol message in the first instance corresponds to the first message type.

17. A base station comprising processing hardware and configured:
receive an uplink (UL) message from a user equipment (UE);
determine whether the UL message includes a positioning protocol message associated with a positioning protocol for exchanging information related to a location service;
in a first instance, in response to determining that the UL message includes the positioning protocol message, send the positioning protocol message to a local entity that implements a location service; and
in a second instance, in response to determining that the message does not include any positioning protocol messages, send at least some of the data included in the UL message to a remote node.

18. The base station of claim 17, further comprising:
the local entity that implements the location service.

19. The base station of claim 17, wherein the local entity is implemented in a radio access network (RAN), in a node coupled to the base station via a network link.

20. The base station of claim 17, wherein the remote node implements an access management function (AMF), in a core network.

* * * * *